US012756797B2

(12) United States Patent
Palande et al.

(10) Patent No.: US 12,756,797 B2
(45) Date of Patent: Oct. 6, 2026

(54) SYSTEMS AND METHODS FOR DETECTING A MIS-SCAN OF AN ITEM FOR PURCHASE

(71) Applicant: Walmart Apollo, LLC, Bentonville, AR (US)

(72) Inventors: Dhanashree Palande, Seattle, WA (US); Mirko A. Arnold, Dublin (IE); Jason Nichols, New Providence, NJ (US); Niyati Lalit Shah, Jersey City, NJ (US); Jadran Sirotkovic, Dublin (IE); Peter M. Terlecky, Yonkers, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 790 days.

(21) Appl. No.: 17/914,295

(22) PCT Filed: Mar. 26, 2021

(86) PCT No.: PCT/US2021/024403
§ 371 (c)(1),
(2) Date: Sep. 23, 2022

(87) PCT Pub. No.: WO2021/195523
PCT Pub. Date: Sep. 30, 2021

(65) Prior Publication Data

US 2023/0120798 A1 Apr. 20, 2023

Related U.S. Application Data

(60) Provisional application No. 63/000,290, filed on Mar. 26, 2020.

(51) Int. Cl.
*G06K 15/00* (2006.01)
*G06K 9/00* (2022.01)
(Continued)

(52) U.S. Cl.
CPC .......... *H04N 7/183* (2013.01); *G06Q 20/208* (2013.01); *G06V 10/25* (2022.01); *G06V 10/70* (2022.01);
(Continued)

(58) Field of Classification Search
CPC .... H04N 7/183; H04N 23/611; G06Q 20/208; G06Q 30/06; G06V 10/25; G06V 10/70; G06V 10/993; G06V 20/52; G06V 40/107
See application file for complete search history.

(56) References Cited

U.S. PATENT DOCUMENTS 6,142,317 A 11/2000 Merl
6,236,736 B1 * 5/2001 Crabtree .......... G08B 13/19602 235/383

(Continued)

FOREIGN PATENT DOCUMENTS

WO 2009061434 A1 5/2009
WO 2018203512 A1 11/2018

(Continued)

OTHER PUBLICATIONS

U.S. Appl. No. 17/920,610; Non-Final Rejection mailed Oct. 7, 2024; (pp. 1-12).

(Continued)

*Primary Examiner* — Talia F Crawley
(74) *Attorney, Agent, or Firm* — Fitch, Even, Tabin & Flannery, LLP

(57) ABSTRACT

In some embodiments, apparatuses and methods are provided herein useful to detecting a mis-scan of an item. In some embodiments, there is provided a system for detecting a mis-scan of an item for purchase comprising a checkout station; a first staging location; a second staging location; a first area of interest at the checkout station; a second area of interest at the checkout station; a camera; and a control
(Continued)

circuit configured to: receive an identifier of a first item; detect a hand of a user purchasing the first item, the first item, and a scanner on a first image captured by the camera; in response to the detection of the hand, the first item, and the scanner, initiate detection of mis-scan items during a checkout process; determine that a payment transaction has been received; and stop the detection of mis-scan items.

29 Claims, 8 Drawing Sheets

(51) Int. Cl.

| | |
|---|---|
| ***G06Q 20/20*** | (2012.01) |
| ***G06V 10/25*** | (2022.01) |
| ***G06V 10/70*** | (2022.01) |
| ***G06V 10/98*** | (2022.01) |
| ***G06V 20/52*** | (2022.01) |
| ***G06V 40/10*** | (2022.01) |
| ***H04N 7/18*** | (2006.01) |
| ***H04N 23/611*** | (2023.01) |

(52) U.S. Cl.

CPC ............ *G06V 10/993* (2022.01); *G06V 20/52* (2022.01); *G06V 40/107* (2022.01); *H04N 23/611* (2023.01)

(56) References Cited

U.S. PATENT DOCUMENTS

| | | | | |
|---|---|---|---|---|
| 7,631,808 | B2 | 12/2009 | Kundu | |
| 7,909,248 | B1 * | 3/2011 | Goncalves | G07G 1/0072 235/462.14 |
| 7,962,365 | B2 | 6/2011 | Bobbitt | |
| 8,068,674 | B2 | 11/2011 | Goncalves | |
| 8,196,822 | B2 | 6/2012 | Goncalves | |
| 8,233,702 | B2 | 7/2012 | Gokturk | |
| 8,260,456 | B2 | 9/2012 | Siegel | |
| 8,448,858 | B1 | 5/2013 | Kundu | |
| 8,494,909 | B2 | 7/2013 | Goncalves | |
| 8,577,136 | B1 | 11/2013 | Ascher | |
| 8,582,802 | B2 | 11/2013 | Clippard | |
| 9,299,229 | B2 | 3/2016 | Bobbitt | |
| 9,589,433 | B1 | 3/2017 | Thramann | |
| 9,727,838 | B2 | 8/2017 | Campbell | |
| 9,740,955 | B2 | 8/2017 | Shi | |
| 9,820,584 | B2 | 11/2017 | Hardy | |
| 10,074,016 | B2 | 9/2018 | Migdal | |
| 10,192,208 | B1 * | 1/2019 | Catoe | G07G 1/0054 |
| 10,349,755 | B2 | 7/2019 | Dipaolo | |
| 10,430,776 | B2 | 10/2019 | Svetal | |
| 10,614,514 | B2 | 4/2020 | Glaser | |
| 10,963,692 | B1 | 3/2021 | Corcoran | |
| 11,375,827 | B2 * | 7/2022 | Yang | A47F 9/048 |
| 12,299,629 | B2 | 5/2025 | Kim | |
| 12,333,813 | B2 | 6/2025 | Horowitz | |
| 2005/0021512 | A1 | 1/2005 | Koenig | |
| 2009/0039164 | A1 * | 2/2009 | Herwig | G07G 1/14 235/462.41 |
| 2009/0090583 | A1 | 4/2009 | Bonner | |
| 2009/0272801 | A1 | 11/2009 | Connell, II | |
| 2010/0023497 | A1 | 1/2010 | Magdy | |
| 2010/0067745 | A1 | 3/2010 | Kovtun | |
| 2010/0171826 | A1 | 7/2010 | Hamilton | |
| 2010/0217678 | A1 | 8/2010 | Goncalves | |
| 2011/0215147 | A1 | 9/2011 | Goncalves | |
| 2011/0286628 | A1 | 11/2011 | Goncalves | |
| 2012/0203647 | A1 | 8/2012 | Smith | |
| 2012/0280040 | A1 * | 11/2012 | Carney | G06Q 20/047 235/383 |
| 2012/0310781 | A1 | 12/2012 | Battle | |
| 2012/0321146 | A1 | 12/2012 | Kundu | |
| 2013/0066592 | A1 | 3/2013 | Aupetit | |
| 2013/0235206 | A1 | 9/2013 | Smith | |
| 2014/0129395 | A1 | 5/2014 | Groenovelt | |
| 2014/0180865 | A1 | 6/2014 | Argue | |
| 2015/0002675 | A1 | 1/2015 | Kundu | |
| 2015/0088703 | A1 | 3/2015 | Yan | |
| 2015/0221191 | A1 | 8/2015 | Doyle | |
| 2015/0242805 | A1 | 8/2015 | Sakurai | |
| 2015/0262116 | A1 | 9/2015 | Katircioglu | |
| 2016/0110786 | A1 * | 4/2016 | Herring | G07G 1/0054 705/26.35 |
| 2016/0132910 | A1 | 5/2016 | Appel | |
| 2016/0187199 | A1 | 6/2016 | Brunk | |
| 2016/0224857 | A1 | 8/2016 | Zhang | |
| 2017/0178061 | A1 | 6/2017 | Griffin | |
| 2017/0249491 | A1 | 8/2017 | Macintosh | |
| 2017/0251183 | A1 * | 8/2017 | Crooks | G06V 20/52 |
| 2017/0262910 | A1 | 9/2017 | Allen | |
| 2017/0286773 | A1 | 10/2017 | Skaff | |
| 2017/0330059 | A1 | 11/2017 | Novotny | |
| 2017/0337508 | A1 | 11/2017 | Bogolea | |
| 2018/0096567 | A1 | 4/2018 | Farrow | |
| 2018/0110345 | A1 | 4/2018 | Sun | |
| 2018/0153313 | A1 | 6/2018 | Padvoiskis | |
| 2018/0330196 | A1 * | 11/2018 | Chaubard | G06F 15/76 |
| 2019/0005343 | A1 * | 1/2019 | Srivastava | G06V 10/809 |
| 2019/0057435 | A1 | 2/2019 | Chomley | |
| 2019/0087772 | A1 | 3/2019 | Medina | |
| 2019/0156152 | A1 | 5/2019 | Scott | |
| 2019/0197560 | A1 | 6/2019 | Migdal | |
| 2019/0220690 | A1 | 7/2019 | Johnson | |
| 2019/0236363 | A1 * | 8/2019 | Bacelis | G06N 3/0464 |
| 2019/0236684 | A1 | 8/2019 | Davis | |
| 2020/0005225 | A1 | 1/2020 | Chaubard | |
| 2020/0074432 | A1 * | 3/2020 | Valdman | G07G 5/00 |
| 2020/0118063 | A1 | 4/2020 | Fu | |
| 2020/0184270 | A1 * | 6/2020 | Omer | G06V 20/52 |
| 2020/0286032 | A1 | 9/2020 | Bogolea | |
| 2021/0019725 | A1 * | 1/2021 | Xiao | G06Q 20/208 |
| 2021/0241208 | A1 | 8/2021 | Tang | |
| 2023/0177458 | A1 | 6/2023 | Kim | |
| 2023/0252407 | A1 | 8/2023 | Kim | |
| 2023/0345093 | A1 * | 10/2023 | Yepez | G06Q 20/18 |
| 2023/0368175 | A1 * | 11/2023 | Coverstone | G06Q 20/3278 |

FOREIGN PATENT DOCUMENTS

| | | |
|---|---|---|
| WO | 2019013711 | 1/2019 |
| WO | 2019140091 A1 | 7/2019 |
| WO | 2021194882 | 9/2021 |
| WO | 2021195314 | 9/2021 |
| WO | 2021195523 | 9/2021 |
| WO | 2021216329 | 10/2021 |
| WO | 2021216357 | 10/2021 |

OTHER PUBLICATIONS

Schroff, F.—"FaceNet: A Unified Embedding for Face Recognition and Clustering"—CVPR 2015, pp. 815-823 (Year: 2015).

U.S. Appl. No. 17/914,745; Non-Final Rejection mailed Dec. 16, 2024; (pp. 1-11).

U.S. Appl. No. 17/910,503; Non-Final Rejection mailed Dec. 16, 2024; (pp. 1-18).

U.S. Appl. No. 17/920,610; Notice of Allowance and Fees Due (PTOL-85) mailed Jan. 27, 2025; (pp. 1-9).

U.S. Appl. No. 17/920,692; Non-Final Rejection mailed Jan. 31, 2025; (pp. 1-23).

U.S. Appl. No. 17/910,503, filed Sep. 9, 2022, Benjamin R. Ellison.

U.S. Appl. No. 17/914,745, filed Sep. 26, 2022, Joshua M. Horowitz.

U.S. Appl. No. 17/920,692, filed Oct. 21, 2022, Sung H. Kim.

U.S. Appl. No. 17/920,610, filed Oct. 21, 2022, Sung H. Kim.

U.S. Appl. No. 17/522,756, filed Nov. 9, 2021, Dhanashree Palande.

Sridhar et al. "Real-time joint tracking of a hand manipulating an object from rgb-d input." European Conference on Computer Vision. Springer, Cham, 2016. Oct. 16, 2016 (Oct. 16, 2016) Retrieved on May 30, 2021 (May 30, 2021) from <https://arxiv .org/pdf/1610. 04889.pdf> (17 pages).

(56) References Cited

OTHER PUBLICATIONS

Infosearch; "Image Annotation, Tagging & Data Annotation, Labeling Services for Machine Learning"; <https://www.infosearchbpo.com/image-labeling-annotation.php>; available at least as early as Feb. 18, 2020; pp. 1-3.
Image Annotation.AI; "Image Annotation for Retail Stores | Supermarkets | Image Annotation.ai"; <https://www.imageannotation.ai/retail 1/5>; available at least as early as Feb. 18, 2020; pp. 1-5.
Low, Jiayin; "What is Image Annotation?"; <https://medium.com/supahands-techblog/what-is-image-annotation-caf4107601b7>; Jan. 10, 2020; pp. 1-5.
PCT; App. No. PCT/US2021/024403; International Preliminary Report on Patentability mailed Oct. 6, 2022; (11 pages).
PCT; App. No. PCT/US2021/024403; International Search Report and Written Opinion mailed Jul. 1, 2021; (20 pages).

* cited by examiner

SYSTEMS AND METHODS FOR DETECTING A MIS-SCAN OF AN ITEM FOR PURCHASE

CROSS-REFERENCE TO RELATED APPLICATION

This application is a U.S. national stage application of International Application No. PCT/US2021/024403 filed Mar. 26, 2021 designating the United States, which claims the benefit of U.S. Provisional Application No. 63/000,290 filed Mar. 26, 2020, both of which are incorporated herein by reference in their entirety.

TECHNICAL FIELD

This invention relates generally to detecting a mis-scan of an item for purchase.

BACKGROUND

Generally, a retail store has a number of checkout stations used by customers to check items out for purchase and some of them are self-checkout stations. During a self-checkout and at a time when an unscanned item is placed in a bagging area, a voice emanating from the self-checkout station can be heard commanding the customer to remove an unscanned item in the bagging area.

BRIEF DESCRIPTION OF THE DRAWINGS

Disclosed herein are embodiments of systems, apparatuses and methods pertaining to detecting a mis-scan of an item for purchase at a checkout station of a retail store. This description includes drawings, wherein.

Figure 1:
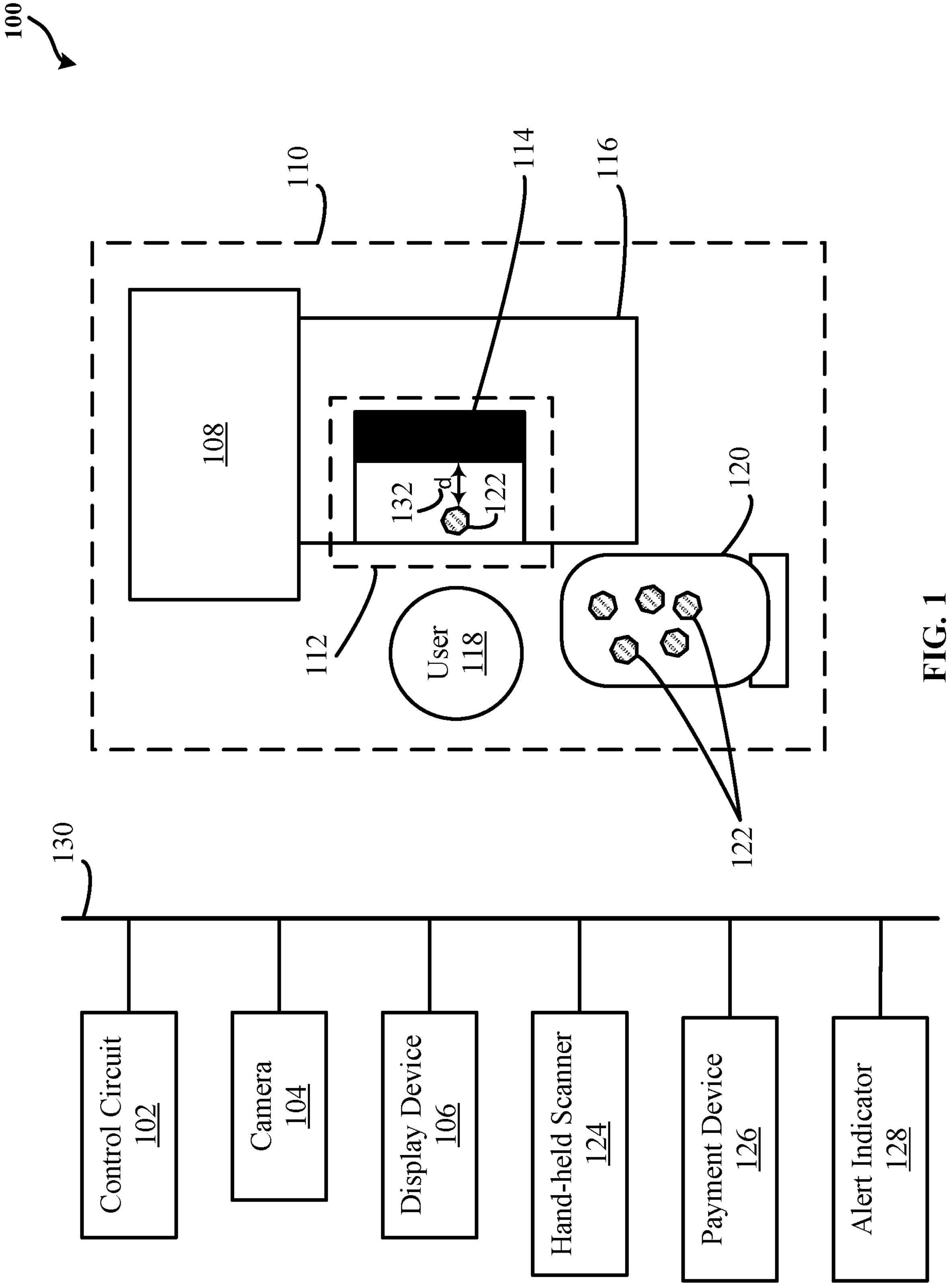
FIG. 1 illustrates a simplified block diagram of an exemplary system for detecting a mis-scan of an item for purchase in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for detecting a mis-scan of an item for purchase. In some embodiments, a system for detecting a mis-scan of an item for purchase at a checkout station of a retail store includes a checkout station of a retail store. By one approach, the checkout station may include a scanner configured to capture an identifier associated with a first item of a plurality of items for purchase. Alternatively or in addition to, the system may include a first staging location configured to secure the plurality of items prior to purchased. In some configurations, the system may include a second staging location configured to secure the plurality of items after purchased. Alternatively or in addition to, the system may include a first area of interest at the checkout station. By one approach, the first area of interest may include a first proximate area encompassing the scanner and within a first threshold distance from the scanner. Alternatively or in addition to, the system may include a second area of interest at the checkout station. By one approach, the second area of interest may include a second proximate area within a second threshold distance from the scanner. For example, the second area of interest may be larger than the first area of interest. In some implementations, the system may include a camera. By one approach, the camera may capture a first image of the first area of interest at a first time during a checkout process. In one configuration, the camera may capture one or more images of the second area of interest at a subsequent time.

By one approach, the system may include a control circuit. In some instance, the control circuit may be communicatively coupled to the scanner and/or the camera. In some configurations, the control circuit may receive the identifier of the first item. Alternatively or in addition to, the control circuit may detect a hand of a user purchasing the first item, the first item, and/or the scanner on the first image captured by the camera at the first time. In some configurations, the control circuit may, in response to the detection of the hand, the first item, and/or the scanner, initiate detection of mis-scan items during the checkout process. For example, the detection of mis-scan items may be based at least on the captured one or more images of the second area of interest at the subsequent time and/or receipt of one or more identifiers associated with the plurality of items located in the first staging location. Alternatively or in addition to, the control circuit may determine that a payment transaction has been received from a user purchasing the first item. Alternatively or in addition to, the control circuit may stop the detection of mis-scan items in response to the receipt of the payment transaction.

In some embodiments, a method for detecting a mis-scan of an item for purchase at a checkout station of a retail store. By one approach, the method may include receiving, by a control circuit, an identifier of a first item of a plurality of items for purchase captured by a scanner of a checkout station during a checkout process. In some configurations, the method may include detecting, at a first time by the control circuit, a hand of a user purchasing the first item, the first item, and/or the scanner on a first image captured by a camera at a first area of interest at a checkout station. For example, the first area of interest at the checkout station may include a first proximate area encompassing the scanner and within a first threshold distance from the scanner. Alternatively or in addition to, the method may include, in response to the detection of the hand, the first item, and/or the scanner on the first image, initiating, by the control circuit, detection of mis-scan items during the checkout process. For example, the detection of mis-scan items may be based at least on one or more images captured, at a subsequent time, by the camera at a second area of interest at the checkout station and/or receipt of one or more identifiers associated with the plurality of items located in a first staging location securing the plurality of items prior to purchased. For example, a second staging location may secure the plurality of items after purchased. In some instances, the second area of interest may include a second proximate area within a second threshold distance from the scanner. By one approach, the second area of interest may be larger than the first area of interest. Alternatively or in addition to, the method may include determining, by the control circuit, that a payment transaction has been received from the user. In some implementations, the method may include stopping, by the control circuit, the detection of mis-scan items in response to the receipt of the payment transaction.

In some embodiments, a system for detecting a mis-scan of an item for purchase at a checkout station of a retail store includes a checkout station of a retail store. The checkout station includes a scanner configured to capture an identifier associated with a first item of a plurality of items for purchase. In some embodiments, the system includes a first area of interest at the checkout station. By one approach, the first area of interest may include a first proximate area encompassing the scanner and within a first threshold distance from the scanner. In some embodiments, the system includes a second area of interest at the checkout station. By one approach, the second area of interest may include a second proximate area within a second threshold distance from the scanner. For example, the second area of interest is larger than the first area of interest. The system includes at least one camera. By one approach, the at least one camera may capture a first image of the first area of interest at a first time during a checkout process. In one configuration, the camera may capture one or more images of the second area of interest at a subsequent time. The system includes a control circuit. In some embodiments, the control circuit may communicatively couple to the scanner and/or the at least one camera. In some embodiments, the control circuit receives an identifier of the first item. The control circuit detects a hand of a user (e.g., the hand may be of a user purchasing the first item or the hand of a user using the checkout station), the first item, and/or the scanner on the first image captured by the at least one camera at the first time. The control circuit, in response to the detection of the hand, the first item, and/or the scanner, initiates detection of mis-scan items during the checkout process. For example, the detection of mis-scan items may be based at least on the captured one or more images of the second area of interest at the subsequent time and/or receipt of one or more identifiers associated with the plurality of items located in the first staging location.

In some embodiments, the control circuit determines that a payment transaction has been received from a user purchasing the first item. Alternatively or in addition to, the control circuit may stop the detection of mis-scan items in response to the receipt of the payment transaction.

Figure 2:
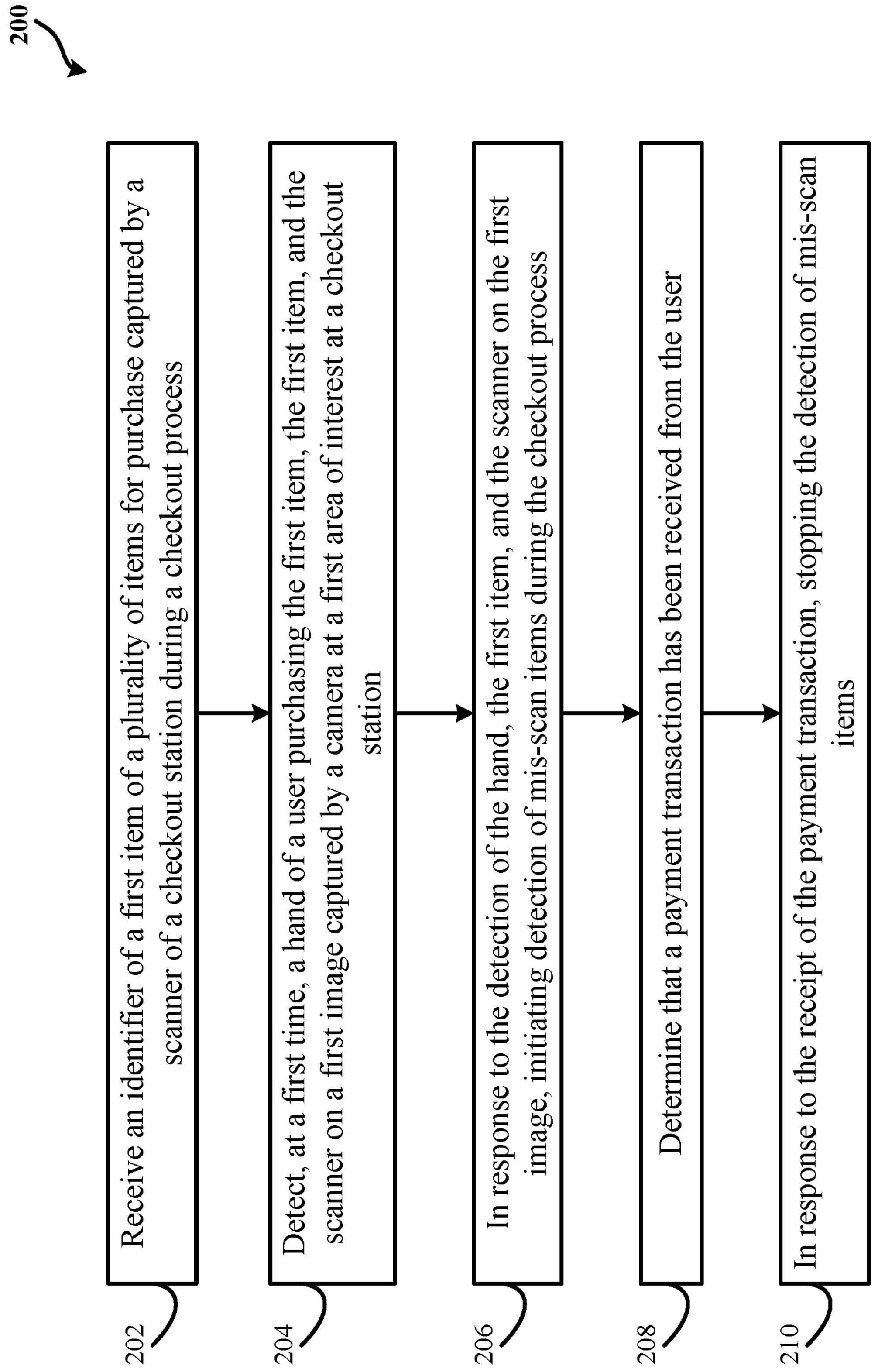
FIG. 2 shows a flow diagram of an exemplary process of detecting a mis-scan of an item for purchase in accordance with some embodiments.
Figure 3:
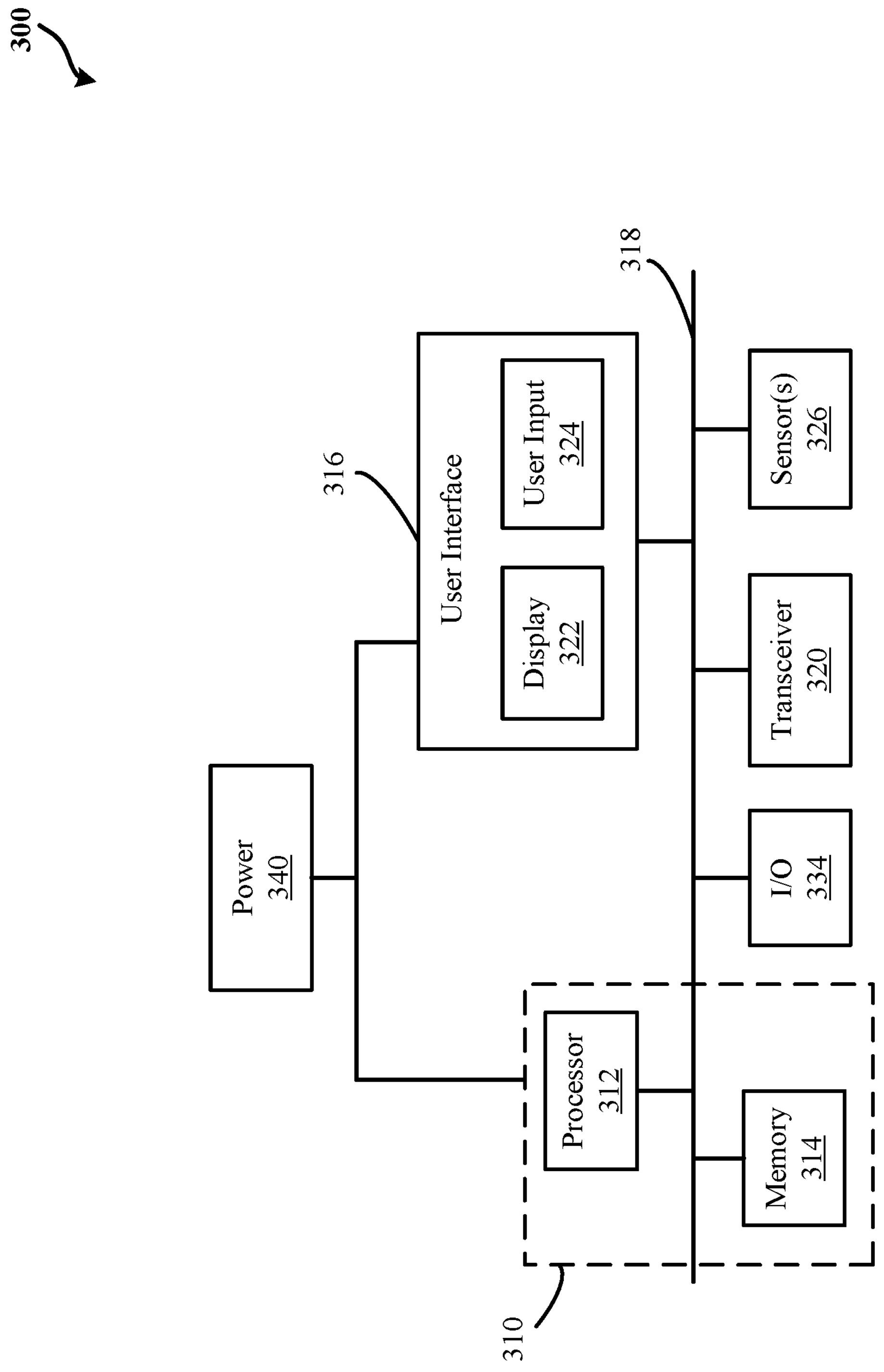
FIG. 3 illustrates an exemplary system for use in implementing methods, techniques, devices, apparatuses, systems, servers, sources and detecting a mis-scan of an item for purchase, in accordance with some embodiments.
Figure 4:
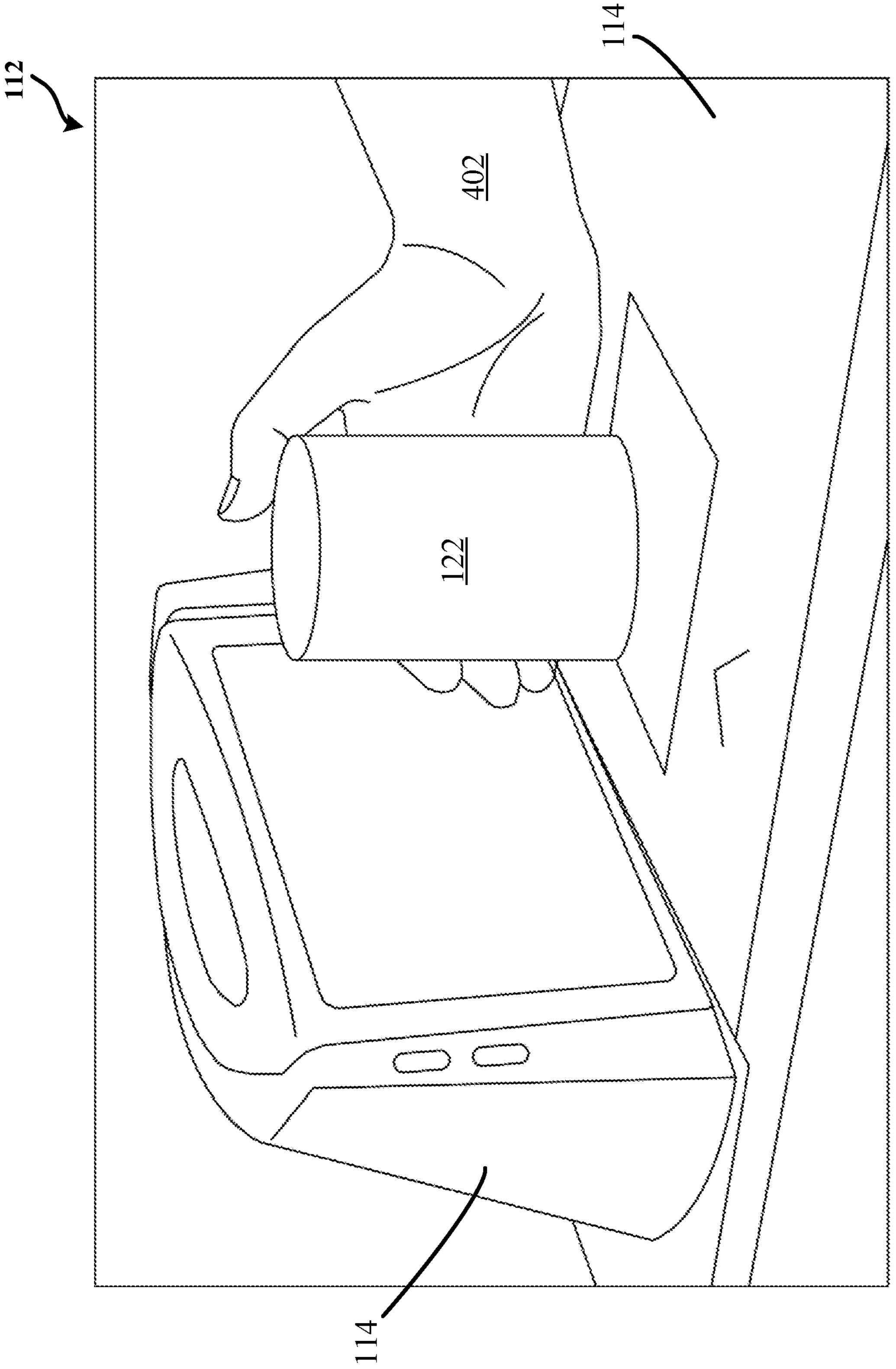
FIG. 4 illustrates a simplified block diagram of an exemplary first area of interest for detecting a mis-scan of an item for purchase in accordance with some embodiments.
Figure 5:
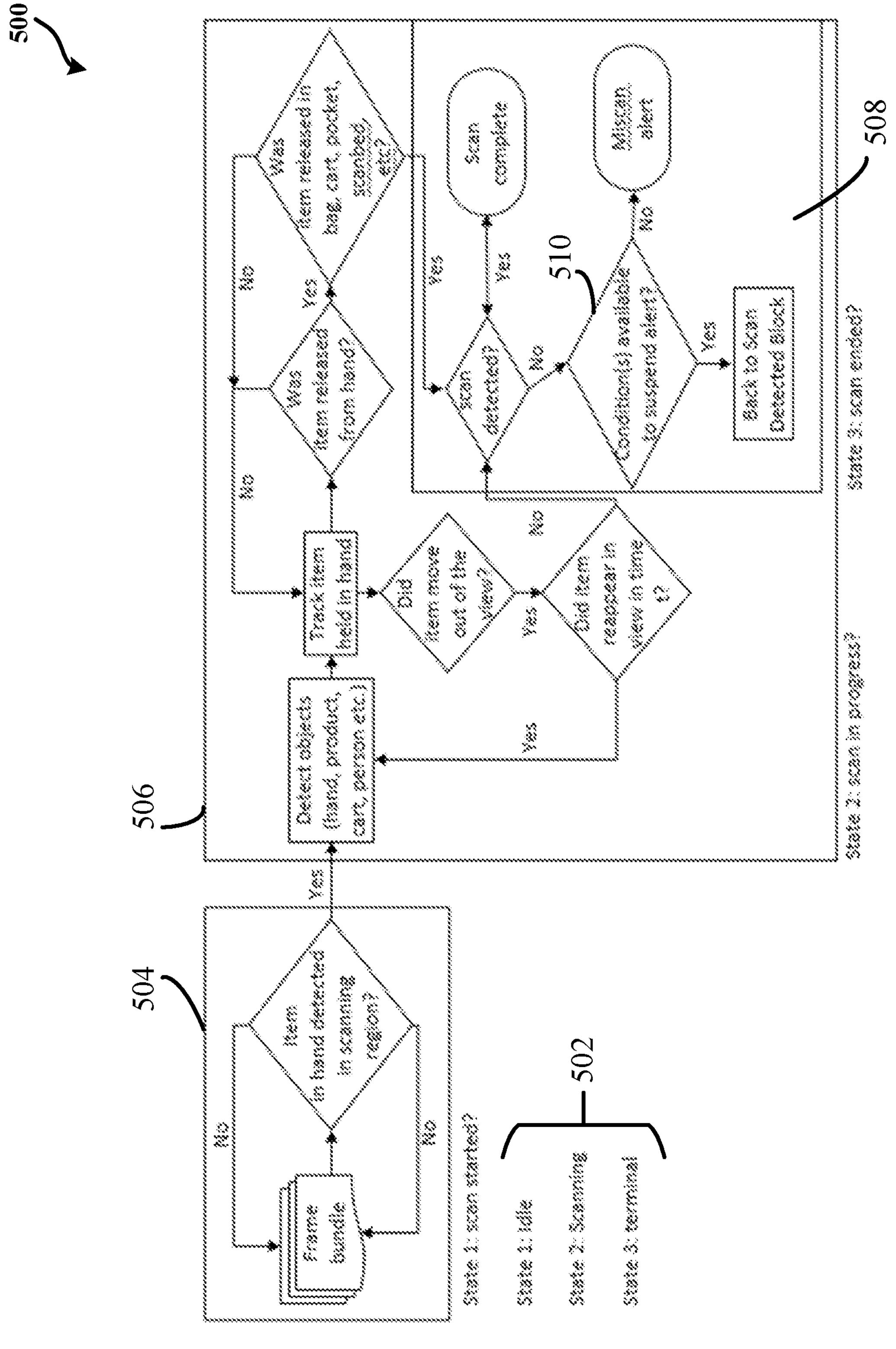
FIG. 5 shows a flow diagram of an exemplary process of detecting a mis-scan of an item for purchase in accordance with some embodiments.
Figure 6:
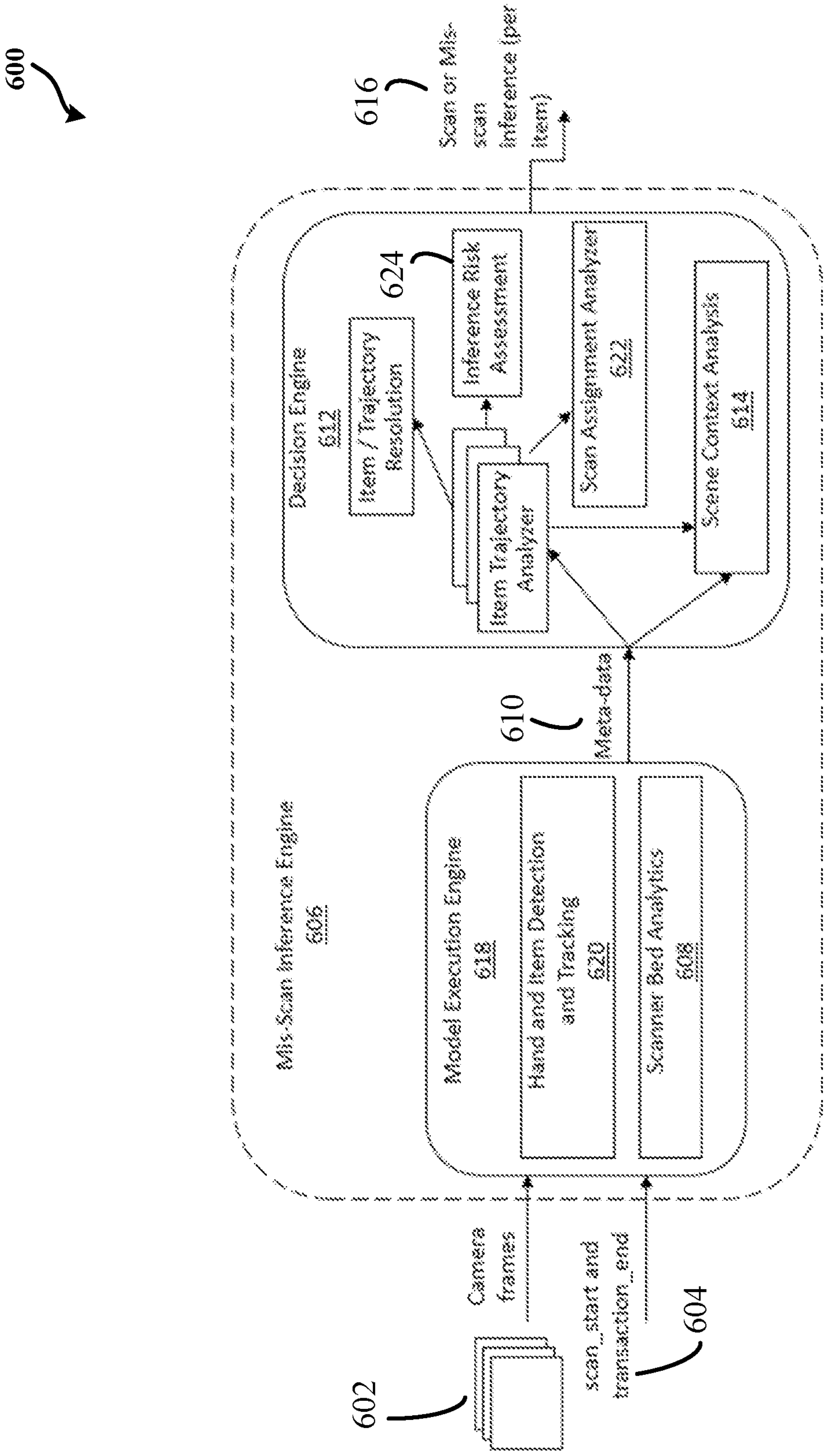
FIG. 6 shows a flow diagram of an exemplary process of detecting a mis-scan of an item for purchase in accordance with some embodiments.

To illustrate, FIGS. 1 through 9 are described below. FIG. 1 illustrates a simplified block diagram of an exemplary system 100 for detecting a mis-scan of an item for purchase in accordance with some embodiments. FIGS. 2, 5, and 6 show a flow diagram of an exemplary process/method 200, 500, 600 of detecting a mis-scan of an item for purchase in accordance with some embodiments. FIG. 4 illustrates a simplified block diagram of an exemplary first area of interest 112 for detecting a mis-scan of an item for purchase in accordance with some embodiments. The system 100 includes one or more checkout stations 116 of a retail store. By one approach, the checkout station 116 may include a scanner 114. In such an approach, the scanner 114 may capture an identifier associated with a first item of one or more items and/or a plurality of items 122 for purchase. For example, an identifier associated with an item for purchase may include a Universal Product Code (UPC), a Quick Response (QR) code, an alpha and/or numeric product code, among other types of identifiers that can be associated with an item in order to facilitate identification on the item electronically. In some implementations, the system 100 may include a first staging location 120. By one approach, the first staging location 120 may secure a plurality of items prior to purchased. In such an approach, the first staging location 120 may include a conveyor belt, a cart, a basket, to name a few. Alternatively or in addition to, the first staging location 120 may include a user 118. For example, the user 118 may hold the item 122 instead of using a cart, a basket, and/or placing the item on a conveyor belt during a checkout process. As such, the illustration of the first staging location 120 in FIG. 1 is an exemplary non-limiting illustration. In some configurations, the system 100 may include a second staging location 108. By one approach, the second staging location 108 may secure the plurality of items after purchased. For example, the second staging location 108 may include a shopping bag, a cart, a basket, and the user 118. In one scenario, the user 118 may have decided to just hold the item 122 instead of using a cart. After scanning the item 122, the user 118 may opt to just hold the item 122 again instead of bagging the item 122. Similarly, in another scenario, the user 118 may use a cart to hold the item 122 prior to scanning the item 122 and after scanning, the user 118 may decide to bag the item 122 and/or bring the item 122 back to the cart. In yet some embodiments, the checkout station 116 may include the first staging location 120 and/or the second staging location 108. Thus, FIG. 1 is an illustrative non-limiting example of one configuration of the checkout station 116. In FIG. 1, the checkout station 116 may include the second staging location 108 (e.g., a bagging area comprising a plurality of shopping bags).

In some implementations, the system 100 may include a first area of interest 112 at the checkout station 116. By one approach, the first area of interest 112 may include a first proximate area encompassing the scanner 114 and/or within a first threshold distance from the scanner 114. In an illustrative non-limiting example, FIG. 4 illustrates the first area of interest 112. Alternatively or in addition to, the system 100 may include a second area of interest 110 at the checkout station 116. By one approach, the second area of interest 110 may include a second proximate area within a second threshold distance from the scanner 114. For example, the second area of interest 110 may be larger than the first area of interest 112. In some scenarios, the first and/or second threshold distances may include a value and/or a range of values that may be measured from an edge of the scanner 114 or from a center of the scanner 114. In another example, the first area of interest 112 may include a first preset and/or predetermined field of view (FOV) of a camera 104. In yet another example, the second area of interest 110 may include a second preset and/or predetermined FOV of the camera 104. By one approach, the second area of interest 110 may include the checkout station 116, the first staging location 120, and/or the user 118. By yet another approach, the second area of interest 110 may include substantially the checkout station 116, the first staging location 120, and/or the second staging location 108.

Alternatively or in addition to, the system 100 may include the camera 104. By one approach, the camera 104 may be assigned to the checkout station 116. As such, each checkout station 116 in the retail store may be associated with a particular camera 104. In some implementations, the camera 104 may be attached overhead and/or hanging from a ceiling and/or proximate the scanner 114. In some configurations, the camera 104 may capture a first image of the first area of interest 112 at a first time during a checkout process. In other configurations, the camera 104 may capture one or more images of the second area of interest 110 at a subsequent time. For example, the first time may include immediately prior to a start of the checkout process and/or at the start of the checkout process. By one approach, the camera 104 may include a box camera, a dome camera, a PTZ camera, a bullet camera, an IP camera, a day/night camera, a thermal camera, a wireless IP camera, and/or a closed-circuit television (CCTV) camera, to name a few.

Alternatively or in addition to, the system 100 may include a control circuit 102. By one approach, the control circuit 102 may communicatively couple to the scanner 114 and/or the camera 104 via a communication network 130 (e.g., a wired and/or wireless network, Internet, WiFi, LAN, WAN, etc.). For example, the control circuit 102 may include a computer, a server, a processor, a central processing unit, an electronic circuitry within a computer that executes instructions that make up a computer program, a distributed computing network, a microprocessor, an electronic device including electrical components, and/or the like. By one approach, the control circuit 102 may be a central computer server controlling, managing, monitoring, and/or executing electronic transactions, activities, and/or operations of the checkout station(s) 116 and/or the camera (s) 104 of the retail store. By yet another approach, the checkout station 116 may include a local control circuit distinct (not shown) from the control circuit 102. In one example, the local control circuit may cooperate with the control circuit 102 to detect a mis-scan of an item 122 for purchase at the checkout station 116.

In some implementations, the control circuit 102 may receive an identifier of the first item 122, at step 202. For example, the scanner 114 may provide the identifier of the first item 122 to the control circuit 102. In such an example, the scanner 114 may scan the identifier of the first item 122 and provide the identifier to the control circuit 102. In another example, the scanner 114 may scan the first item 122 and in cooperation with the control circuit 102 identify that the first item 122 is associated with a particular product. In yet another example, the control circuit 102 may determine that the first item 122 has been scanned based on the receipt of the identifier. However, by one approach, the control circuit 102 may just need to determine that a product has been scanned without regards to determining the kind of product the first item 122 is associated with. As such, the control circuit 102 may use the determination that an item has been scanned to match with a determination that an item has been placed in the second staging location 108. By one approach, a determination that an item has been placed in the second staging location 108 without a determination that an item has been scanned may cause the control circuit 102 to determine that a mis-scan has likely been detected and cause suspension of the checkout process.

Alternatively or in addition to, the control circuit 102 may detect a hand 402 of FIG. 4 of the user 118 purchasing the first item 122, the first item 122, and/or the scanner 114 on a first image captured by the camera 104 at a first time, at step 204. For example, as shown in FIG. 4. By one approach, the camera 104 may periodically capture a plurality of images over a period of time. In such an approach, the control circuit 102 may determine whether a hand of the user 118 purchasing the first item 122, the first item 122, and/or the scanner 114 are detected from the captured images. To detect objects, such as a hand, an item, and/or the scanner 114, to name a few, the control circuit 102 may use digital/image signal processing techniques publicly and/or commercially available. In some configurations, a field of view (FOV) of the camera 104 may be initially set to focus on the first area of interest 112. In such a configuration, a processing time and/or power spent by the control circuit 102 to detect a hand of the user 118, the first item 122, and/or the scanner 114 on an image captured by the camera 104 having a limited/narrower FOV at the time of capture can be reduced as compared to the processing time and/or power spent by the control circuit 102 to detect a hand 402 of the user 118, the first item 122, and/or the scanner 114 on an image captured by the camera 104 having a wider FOV (e.g., the wider FOV may include the second area of interest 110).

In some implementations, the control circuit 102 may, in response to the detection of the hand, the first item 122, and/or the scanner 114, initiate detection of mis-scan items during the checkout process, at step 206. For example, the detection of the hand, the first item 122, and/or the scanner 114 may trigger the control circuit 102 to initiate and/or start tracking items for purchase in captured images. By one approach, in response to the detection, the control circuit 102 may cause the camera 104 to switch the FOV of the camera 104. In such an approach, the camera 104 may start capturing images in the second area of interest 110 in response to the detection of the hand, the first item 122, and/or the scanner 114. For example, the detection of mis-scan items may be based at least on the captured one or more images of the second area of interest 110 at a subsequent time and/or receipt of one or more identifiers associated with a plurality of items located in the first staging location 120. In some embodiments, more specific examples of detecting mis-scanned items are described in connection with FIGS. 4-9. In some configurations, the control circuit 102 may determine that a payment transaction has been received from the user 118 purchasing the first item 122, at step 208. For example, the user 118 may pay for the items purchased via a payment device 126 after scanning the last item for purchase in the first staging location 120. In one scenario, the payment device 126 may include a credit card reader, a purchase card reader, a cash and/or coin receiver, and/or the like. In some implementations, the control circuit 102 may stop the detection of mis-scan items in response to the receipt of the payment transaction. For example, the control circuit 102 may stop tracking items for purchase in captured images in response to the receipt of the payment transaction, at step 210. Alternatively or in addition to, in response to the stopping of the detection of mis-scan items, the control circuit 102 may cause the camera 104 to switch FOV. For example, the camera 104 may start capturing images in the first area of interest 112 again.

In some embodiments, the control circuit 102 may, subsequent to the initiation of the detection of mis-scan, track movement of each remaining one of the plurality of items from the first staging location 120 to the second staging location 108. For example, the control circuit 102 may track movement of items on captured images based on publicly and/or commercially available digital tracking techniques. In another example, the control circuit 102 may the detect the hand 402 of the user 118, the first item 122, and/or the scanner 114. Upon the detection, the control circuit 102 may detect items for purchase on subsequent images and start tracking each detected items from one image to another in order to determine whether the item is moved from the first staging location 120 to the second staging location 108. Alternatively or in addition to, the control circuit 102 may determine that a corresponding identifier of a corresponding remaining one of the plurality items tracked to move from the first staging location 120 to the second staging location 108 has been captured by the scanner 114. For example, subsequent to the tracking of the movement of an item from the first staging location 120 to the second staging location 108, the control circuit 102 may, for a period of time, determine whether an identifier has been received from the scanner 114. In such an example, in response to the determination that the corresponding identifier has been captured by the scanner 114, the control circuit 102 may determine that a mis-scan has not occurred and/or cause the checkout process to continue.

Alternatively or in addition to, the control circuit 102 may track movement of each remaining one of the plurality of items from the first staging location 120 to the second staging location 108. For example, subsequent to the tracking of the movement of an item from the first staging location 120 to the second staging location 108, the control circuit 102 may, for a period of time, determine whether an identifier has been received from the scanner 114. By one approach, the control circuit 102 may determine that a corresponding identifier of a corresponding remaining one of the plurality items tracked to move from the first staging location 120 to the second staging location 108 has not been captured by the scanner 114. For example, the control circuit 102 may determine that an item has not been scanned based on not receiving an identifier from the scanner 114 after waiting for a period of time. In some configurations, the control circuit 102 may, in response to the determination that the corresponding identifier has not been captured by the scanner 114, determine that a mis-scan has likely been detected. Alternatively or in addition to, the control circuit 102 may cause suspension of the checkout process in response to the determination that a mis-scan has likely been detected.

In some embodiments, prior to the determination that the corresponding identifier has not been captured by the scanner 114, the control circuit 102 may determine that the corresponding remaining one is a saleable item. For example, subsequent to the tracking of the movement of an item from the first staging location 120 to the second staging location 108, the control circuit 102 may determine whether the tracked item is a saleable item. In such an example, the control circuit 102 may perform object recognition based at least on the captured image and an access to a database (not shown) storing images of items for sale at the retail store. By one approach, the database may include a random access memory, a read only memory, a memory storage, a volatile memory, a non-volatile memory, a solid-state drive, a hard disk drive, and/or any commercially available electronic storage devices capable of storing computer data electronically. In such an implementation, the database may be local to the retail store and/or accessed via a wired and/or wireless network (e.g., Internet, WiFi, LAN, WAN, etc.). For example, the control circuit 102 may perform object recognition image processing using publicly and/or commercially available techniques and/or machine learning algorithm (e.g., deep learning neural network model architecture and/or traditional AI and/or computer-vision models) and/or a Kalman prediction, an association algorithm and/or a confidence determination. By one approach, the control circuit 102 may compare detect the item to be tracked on the image, compare the detected item to items stored in the database, and determine whether the detected item matches one of the items stored in the database. In one configuration, the control circuit 102 may determine that the detected item is a saleable item when there is a match. In another configuration, the control circuit 102 may determine that the detected item is not a saleable item when there is not a match. In such a configuration, in response to the determination that the detected item is not a saleable item (for example, a personal item such as keys, a phone, a hand bag, and so on), the control circuit 102 may continue the checkout process and not wait to receive an identifier. In an event that the detected item is determined to be a saleable item, the control circuit 102 may subsequently determine whether an identifier has been captured by the scanner 114 and/or received by the control circuit 102 in order to determine whether a mis-scan has likely been detected.

In some implementations, in a determination that a mis-scan has likely been detected, the control circuit 102 may provide an alert to a checkout station host (e.g., an associate of the retail store and/or an electronic device associated with the associate assigned to the checkout station 116) and/or an associate to verify the detection of the mis-scan and/or to confirm that a mis-scan has indeed occurred. Alternatively or in addition to, the alert may cause an alert indicator 128 to light up indicating that a mis-scan is likely to have occurred. By one approach, the control circuit 102 may end the suspension and continue the checkout process upon a receipt of an input from the checkout station host and/or the associate. In one scenario, the input may indicate to the control circuit 102 that the mis-scan has been corrected and/or addressed. In yet another scenario, the input may indicate to the control circuit 102 that a mis-scan has not occurred. In one configuration, the input may be communicated to the control circuit 102 via a display device 106. In one example, the display device 106 may include a monitor coupled to the checkout station 116 and/or a smartphone, a laptop, a tablet, and/or the like.

In some embodiments, the control circuit 102 may, subsequent to the initiation of the detection of mis-scan, track movement of each remaining one of the plurality of items from the first staging location 120 to the second staging location 108. In such an embodiment, the control circuit 102 may determine that a mis-scan has not occurred even when no identifier has been received subsequent to the tracked movement of the remaining one from the first staging location 120 to the second staging location 108 upon a determination that at least one of: a hand-held scanner 124 was used to capture a corresponding identifier of a corresponding remaining one of the plurality items tracked to move from the first staging location 120 to the second staging location 108; the user 118 has interacted with the display device 106 of the checkout station 116; receipt at multiple times of the corresponding identifier and a subsequent movement of a single item from the first staging location to the second staging location. For example, the control circuit 102 may determine that a mis-scan has not occurred even when no identifier has been received from the scanner 114 when the control circuit 102 detects that the user 118 used the hand-held scanner 124 instead of the scanner 114 to scan the item 122. In another example, the control circuit 102 may determine that a mis-scan has not occurred even when no identifier has been received from the scanner 114 when the user 118 has interacted with the display device 106 (e.g., provide an input and/or touched the display device 106). In yet another example, the control circuit 102 may determine that a mis-scan has not occurred even when no identifier has been received from the scanner 114 when the control circuit 102 has received an identifier multiple times (e.g., the user 118 scanned one or more items belonging to the same product) and subsequently detected a movement of only a single item from the first staging location 120 to the second staging location 108 (e.g., the user 118 after scanning the item 122 multiple times places the item 122 in a box or a container having multiple items of the same product as the item 122 and subsequently moving the entire box or container from the first staging location 120 to the second staging location 108). By one approach, the movement of the single item may include a single movement of a group of multiple remaining ones of the plurality of items from the first staging location 120 to the second staging location 108.

In yet another example, the control circuit 102 may determine that a mis-scan has not occurred even when no identifier has been received subsequent to the tracked movement of the remaining one from the first staging location 120 to the second staging location 108 upon a determination by the control circuit 102 that a hand of the user 118 is detected to hold an unidentified item proximate to the payment device 126. In such an example, the unidentified item may include a credit card and/or cash. In some embodiments, the control circuit 102 determines that a mis-scan has not occurred upon a determination by the control circuit 102 that a first item and a second item have been captured by the camera 104 over the scanner 114 substantially at the same time. For example, the first item appears and/or detected on a first image captured by the camera 104. The second item then appears and/or detected on a second image captured by the camera 104 substantially at the same time and/or immediately after capturing the first image.

Alternatively or in addition to, the control circuit 102 may determine that the item 122 has been successfully scanned based on a light indicator of the checkout station 116 being lit and/or a receipt of an audible sound by a receiver device coupled to the checkout station 116. As such, the control circuit 102 may determine that a mis-scan has not occurred and cause the checkout process to continue upon a receipt of the identifier from the scanner 114, a signal from the light indicator indicating that the light indicator is lit, and/or a signal indicating that an audible sound has been received by the receiver device. By one approach, upon a determination of not receiving the identifier from the scanner 114, not receiving the signal from the light indicator indicating that the light indicator is lit, and not receiving the signal indicating that an audible sound has been received by the receiver device, the control circuit 102 may determine that a mis-scan has likely been detected and cause a suspension of the checkout process. In some embodiments, the control circuit 102 may start tracking items when the items enter the field of view (FOV) of the camera 104 and/or stop tracking the items when the items leave the FOV. In such an embodiment, the first staging location 120 may not be included in the second area of interest 110. Alternatively or in addition to, the second area of interest 110 may not include the second staging location 108. For example, the second area of interest 110 may not include the first staging location 120 and the second staging location 108. In such an example, the control circuit 102 may start tracking items when the items enter the second area of interest 110 and/or stop tracking the items when the items leave the second area of interest 110.

Alternatively in addition to, the control circuit 102 may execute an algorithm 502 of FIG. 5 that detects input from the camera 104, the scanner 114, the display device 106, the hand-held scanner 124, and/or the payment device 126, to name a few. By one approach, the algorithm may include a plurality of state machines, engines, and/or modules each with a particular task to perform that ultimately detects a mis-scan of an item for purchase has occurred. For example, a mis-scan may include an event when a customer at the checkout station 116 performs a scan action of an item but the item is not rung up. In such an example, the mis-scan may have been caused by the customer holding the item incorrectly and/or did not present or show the item's identifier (e.g., a barcode) to the scanner 114. In another example, the customer may have thought that the item was already but missed. In yet another example, the mis-scan may have been caused by the customer's malicious intention. In one scenario, to pretend and/or appear to go through the scanning motion, the customer may move an item around the scanner 114, swipe over the scanner 114, cover the item's identifier while scanning, swipes too quickly, to name a few, in order to appear to the camera 104 that a scanning motion is being performed, therefore a purchase is being made. In yet another scenario, the mis-scan may have been caused by the customer moving an item directly from the first staging location 120 to the second staging location 108 (e.g., from conveyor belt to bag, cart, pocket, and/or basket and/or from basket and/or cart to bag and/or pocket). In another example, the mis-scan may have been caused by the customer scanning one item and bagging multiple items, stacking multiple items around the scanner 114 and scanning one item and bagging multiple items. In yet another example, the mis-scan may have been caused by the customer fast scanning multiple items before the scanner 114 is enabled and/or holding multiple items in one hand while scanning only one item and bagging multiple items.

In FIG. 5, the algorithm 502 executed by the control circuit 102 in cooperation with the camera 104 and/or the scanner 114 may visually track a trajectory of an item 122 being moved across the scanner 114. In one scenario, the control circuit 102 may provide an alert if no scan is detected and/or registered by the scanner 114. In some embodiments, the algorithm 502 may include a scan started 504, a scan in progress 506, and/or a scan ended 508. By one approach, in the scan started 504, a frame bundle and/or an image from the camera 104 may be received. In such an approach, the control circuit 102 may determine whether an item in a hand of a customer is detected in a scanning region (e.g., the first area of interest 112 and/or the second area of interest 110). Alternatively or in addition to, in the scan in progress 506, the control circuit 102 may track the item and determine whether the item was released and/or moved out of view. For example, the control circuit 102 may determine whether the item reappeared after a period of time and if not, then determine whether a scan was detected in the scan ended 508. In another example, the control circuit 102 may determine that the item was released from the hand. By one approach, the control circuit 102 may determine whether the item was released in the second staging location 108 and/or the first staging location 120. Alternatively or in addition to, in the scan ended 508, the control circuit 102 may determine whether a scan was detected (e.g., an identifier of an item was provided by the scanner 114 to the control circuit 102, to name a few) within a period of time. By one approach, the control circuit 102 may continue the checkout process upon a detection of a scan of an item. By another approach, the control circuit 102 may determine that a mis-scan may have occurred upon a failure to detect a scan of an item after a period of time.

In some embodiments, condition(s) available to suspend alert? block 510 in the scan ended 508 checks whether one or more conditions exist to stop a mis-scan alert are available, determined, and/or detected by the control circuit 102. For example, in some cases, absent one or more conditions, the system concludes that a mis-scan has likely occurred. In some embodiments, the one or more conditions are determined by the control circuit 102 based on whether at least one of: (1) a timeout threshold to receive a scan signal (or a scan event) has not been reached, e.g., a scan is not received but the timeout threshold has not expired; (2) a tracked item (or its corresponding identifier) is on a listing stored in a database coupled to the control circuit 102, e.g., a GTIN (Global Trade Item Number) is received for a scanned item and that item appears on a 'whitelist' of items that should not trigger a mis-scan; (3) a hand-held scanner 124 was used to scan a tracked item, e.g., the control circuit 102 may track the hand-held scanner 124 in the view of at least one camera 104 and/or use an in-built signal from the checkout station 116; (4) purchase transaction has ended; (5) the tracked item was scanned and staged (e.g., placed in a bag and/or the second staging location 108); (6) the tracked item reappeared at a location where staged items are located and/or as an item in the staging area; (7) the tracked item was scanned and bagged then subsequently moved back to the bagging area and/or the second staging location 108; (8) the tracked item was determined to be a non-sku item and/or a non-saleable item (e.g., a personal item); and/or (9) the control circuit 102 via a machine learning model associated and/or determined a lower probability of mis-scan on the tracked item based on one or more features, e.g., see the example features described below. In some embodiments, if any of the one or more conditions are available, met, and/or satisfied, the control circuit 102 will not send a mis-scan alert. It is understood that this is not an exhaustive listing of potential conditions that could be used by a system to determine whether to suspend a mis-scan alert. In some embodiment, the mis-scan detection system seeks to avoid false positive detection of mis-scans and unnecessarily interrupting the checkout process. And in some embodiments, the system may determine to not issue an alert in all circumstances where it appears that they may be a mis-scan event. And in some embodiments, it is understood that the detection may not be perfect and that an alert may not necessarily occur for every actual mis-scan event. In some embodiments, the condition(s) available to suspend alert? block 510 is part of an Inference Risk Assessment block 624 shown in FIG. 6.

In some embodiments, FIG. 6 shows a flow diagram of an exemplary process/method 600 of detecting a mis-scan of an item for purchase. By one approach, the control circuit 102 may execute an algorithm 604 including a mis-scan inference engine 606. In some configurations, the mis-scan inference engine 606 may include a model execution engine 618, a scanner bed analytics 608, a decision engine 612, and/or a scene context analysis 614. By one approach, a meta-data output 610 of the model execution engine 618 may be input to the decision engine 612 to enable the control circuit 102 to determine whether a mis-scan has occurred 616. In some configurations, camera frames and/or images 602 captured by the camera 104 may be used by the model execution engine 618 to determine the meta-data output 610.

For example, the model execution engine 618 may hosts a set of neural networks and/or classic machine vision models. By one approach, an object detector and tracker of a hand and item detection and tracking module 620 of the model execution engine 618 may detect and/or track hands and/or item objects. In one example, the hand and item detection and tracking module 620 may include publicly and/or commercially available sophisticated OD neural network that may be combined with CV tracker. In some configurations, movement and/or trajectory of one or more items may be determined by the hand and item detection and tracking module 620. In some implementations, the scanner bed analytics 608 may manage hibernation state of the system 100 and/or wake-up and/or initiate more complex models. In another example, the scanner bed analytics 608 may detect a start of a scan attempt. In another example, the scanner bed analytics 608 may detect presence of the scanner 114 and/or the hand-held scanner 124 in its holster. In yet another example, the scanner bed analytics 608 may detect a color of a light indicator of the checkout station 116. In such an example, the light indicator may be one of a plurality of scan indicators of the checkout station 116 that provide indication to the control circuit 102 that an item has been scanned.

Alternatively or in addition to, the decision engine 612 may integrate and/or validate inferences and/or determinations by the control circuit 102. For example, the control circuit 102 may use machine learning models to facilitate detection, tracking, and/or determination of items in the camera's 104 FOV. In one scenario, the decision engine 612 may produce an end-to-end mis-scan versus no mis-scan decision based at least on the item trajectory and/or its temporal correlation with other information (e.g., hand scanner position, screen interaction, to name a few). Alternatively or in addition to, the scene context analysis 614 may compute and/or monitor for change and/or maintains states of relevant scene conditions based on a plurality of input model inferences accessed and/or used by the control circuit 102. By one approach, information associated with the states of relevant scene conditions may be used to a trajectory analysis component to compute a final decision of whether a mis-scan has occurred. For example, scene aspects managed by the trajectory analysis component may include position of the hand-held scanner 124, monitoring for interaction of a hand with a screen (e.g., the display device 106), maintains a listing of items present in an image, a scene, and/or a FOV and/or movement history of the items. Alternatively or in addition to, an item trajectory analyzer of the decision engine 612 may maintain the state of each hand-held item detected and/or tracked by the control circuit 102 (for example, through the use of a plurality of neural network models). By one approach, the item trajectory analyzer may perform real-time and/or near real-time analysis of each item's trajectory. For example, the item trajectory analyzer may correlate position and/or movement of an item with presence of scan events and/or outputs of other models and/or previously described scene analyzers. By another approach, the inference risk assessment block 624 of the decision engine 612 may detect scene conditions that one or more neural network models may have difficulty handling correctly. In some configurations, the inference risk assessment may suppress positive inferences while detected scene conditions are present. For example, multiple items held over the scanner 114 window (e.g., hard to decide which item of a plurality of items got scanned), a large number of people on the scene packing together, to name a few.

In some embodiments, the decision engine 612 includes a scan assignment analyzer block 622. The scan assignment analyzer block 622 may use a buffer of received scans from the scanner 114 (such as received product identifier signals from the scanner) and attempts to assign or associate a received scanner signal to a visually tracked item in the captured images from the camera/s. In some embodiments, the received scans include a pre-scan assignment (e.g., if the signal from the scanner 114 is received before the scanner 114 and item contact (e.g., item has been brought into scanning range of the scanner 114) is determined by the control circuit 102 based on the captured one or more images), a post scan assignment (e.g., if the scan signal from the scanner 114 is received after the item is detected from the captured images and moved away from the scanner 114), an improved scan assignment in case of double item contact is seen from the captured images, and/or an assignment of a scan (e.g., identifier received from the scanner 114) to an item even if the scanner 114 and an item contact is not visually detected based on the captured one or more images.

Further, the circuits, circuitry, systems, devices, processes, methods, techniques, functionality, services, servers, sources and the like described herein may be utilized, implemented and/or run on many different types of devices and/or systems. FIG. 3 illustrates an exemplary system 300 that may be used for implementing any of the components, circuits, circuitry, systems, functionality, apparatuses, processes, or devices of the system 100 of FIG. 1, the method 200 of FIG. 2, and/or other above or below mentioned systems or devices, or parts of such circuits, circuitry, functionality, systems, apparatuses, processes, or devices. For example, the system 300 may be used to implement some or all of the system for the checkout station 116, the scanner 114, the camera 104, the control circuit 102, the display device 106, the hand-held scanner 124, the payment device 126, the alert indicator 128, the communication network 130, and/or other such components, circuitry, functionality and/or devices. However, the use of the system 300 or any portion thereof is certainly not required.

By way of example, the system 300 may comprise a processor module (or a control circuit) 312, memory 314, and one or more communication links, paths, buses or the like 318. Some embodiments may include one or more user interfaces 316, and/or one or more internal and/or external power sources or supplies 340. The control circuit 312 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 312 can be part of control circuitry and/or a control system 310, which may be implemented through one or more processors with access to one or more memory 314 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 300 may be used to implement one or more of the above or below, or parts of, components, circuits, systems, processes and the like. For example, the system 300 may implement the system for detecting a mis-scan of an item for purchase at a checkout station of a retail store with the control circuit 102 being the control circuit 312.

The user interface 316 can allow a user to interact with the system 300 and receive information through the system. In some instances, the user interface 316 includes a display 322 and/or one or more user inputs 324, such as buttons, touch screen, track ball, keyboard, mouse, etc., which can be part of or wired or wirelessly coupled with the system 300. Typically, the system 300 further includes one or more communication interfaces, ports, transceivers 320 and the like allowing the system 300 to communicate over a communication bus, a distributed computer and/or communication network (e.g., a local area network (LAN), the Internet, wide area network (WAN), etc.), communication link 318, other networks or communication channels with other devices and/or other such communications or combination of two or more of such communication methods. Further the transceiver 320 can be configured for wired, wireless, optical, fiber optical cable, satellite, or other such communication configurations or combinations of two or more of such communications. Some embodiments include one or more input/output (I/O) interface 334 that allow one or more devices to couple with the system 300. The I/O interface can be substantially any relevant port or combinations of ports, such as but not limited to USB, Ethernet, or other such ports. The I/O interface 334 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 326 to provide information to the system and/or sensor information that is communicated to another component, such as the checkout station 116, the scanner 114, the camera 104, the control circuit 102, the display device 106, the hand-held scanner 124, the payment device 126, the alert indicator 128, the communication network 130, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 300 comprises an example of a control and/or processor-based system with the control circuit 312. Again, the control circuit 312 can be implemented through one or more processors, controllers, central processing units, logic, software and the like. Further, in some implementations the control circuit 312 may provide multiprocessor functionality.

The memory 314, which can be accessed by the control circuit 312, typically includes one or more processor readable and/or computer readable media accessed by at least the control circuit 312, and can include volatile and/or nonvolatile media, such as RANI, ROM, EEPROM, flash memory and/or other memory technology. Further, the memory 314 is shown as internal to the control system 310; however, the memory 314 can be internal, external or a combination of internal and external memory. Similarly, some or all of the memory 314 can be internal, external or a combination of internal and external memory of the control circuit 312. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 314 can store code, software, executables, scripts, data, content, lists, programming, programs, log or history data, user information, customer information, product information, and the like. While FIG. 3 illustrates the various components being coupled together via a bus, it is understood that the various components may actually be coupled to the control circuit and/or one or more other components directly.

Figure 7:
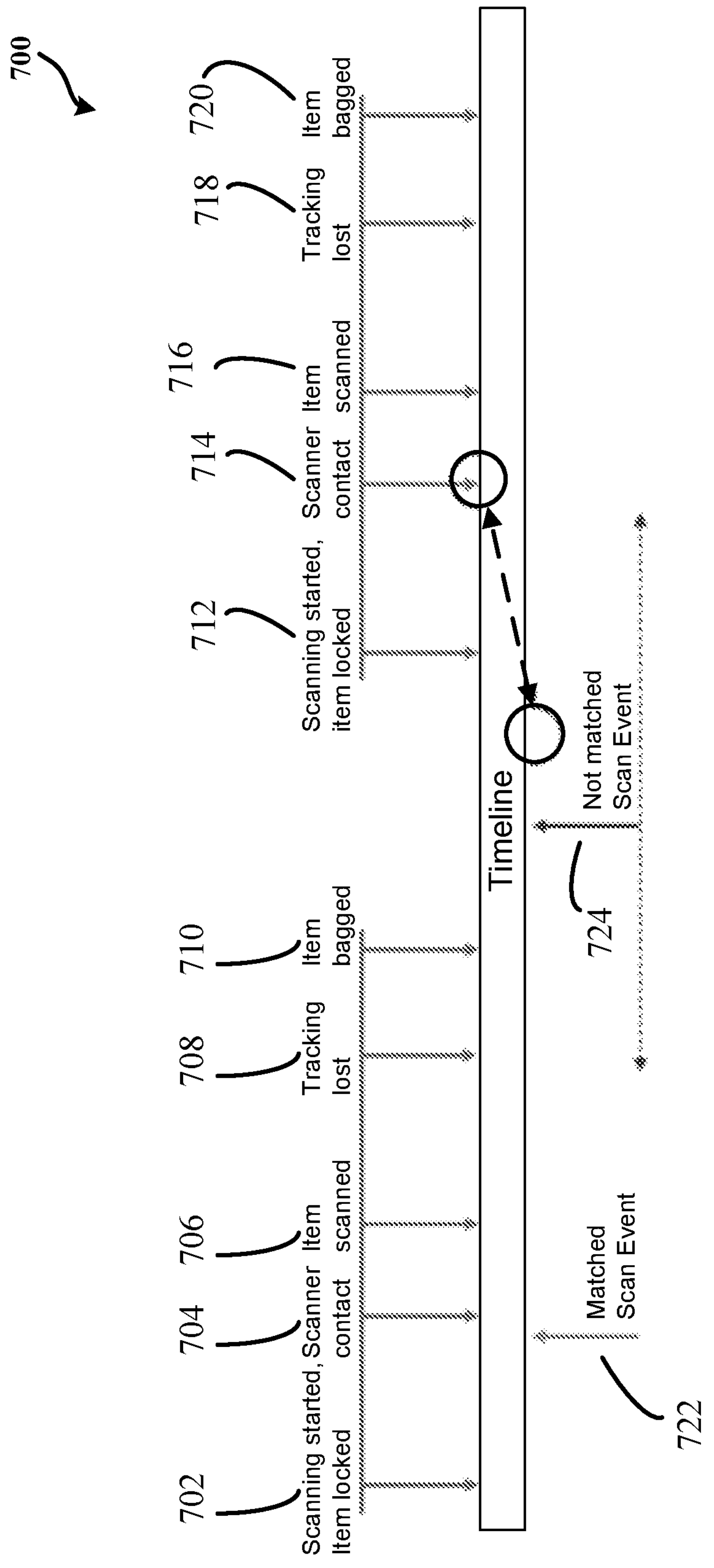
FIG. 7 shows a timeline of an exemplary process of detecting a mis-scan of an item for purchase in accordance with some embodiments.

FIG. 7 shows a timeline of an exemplary process/method 700 for detecting a mis-scan of an item for purchase in accordance with some embodiments. In some embodiments, the control circuit 102 processes one or more images captured by one or more cameras 104 to detect, track, and/or determine items and/or events and/or activities (e.g., scanning of an item, placing an item in scanning range of the scanner 114, tracking an item, determining an item has been scanned, bagging an item, taking an item out of a bag, and/or any activities and/or events that my occur during a time that items are being process/checkout/purchase at a checkout station 116) occurring in the one or more cameras' 104 field of view (FOV). In an illustrative non-limiting example, the control circuit 102 may use one or more image processing techniques and/or machine learning models to process the captured one or more images to identify and track items as they appear and move in the captured images. For example, at step 702, the control circuit 102 may process the captured one or more images to initiate detection of mis-scan items as described above and determine and/or identify an item to be scanned by a user at a checkout station 116. In some embodiments, at step 722, the control circuit 102 receives an identifier (e.g., barcode, QR code, any one or more item identifiers publicly used to digitally and/or electronically identify an item) captured by the scanner 114. In one embodiment, a scan event is an identifier signal received from the scanner 114. In some embodiments, at step 704, the control circuit 102 determines the item has been placed in scanning range of the scanner 114 from the captured one or more images. In some embodiments, the placing of the item in the scanning range may be referred to as scanner contact. In some embodiments, a scanning range of the scanner 114 includes a first area of interest at a checkout station 116 (e.g., a first proximate area encompassing the scanner 114 and within a first threshold distance from the scanner 114 and/or "d" 132 of FIG. 1), a sensing distance of an optical and/or digital sensor used in the scanner 114, a perimeter of the scanner 114, an immediate area surrounding the scanner 114, and/or the like. In some embodiments, at step 722, the control circuit 102 assigns the identifier to the item. In such an embodiment, the assignment of the identifier to the item is in response to a determination by the control circuit 102 that the receipt of the identifier and the determination that the item has been placed in scanning range of the scanner 114 are within a period of time expected by the control circuit 102. In some embodiments, the period of time expected by the control circuit 102 includes a range of time before and/or after the determination that the item has been placed in scanning range of the scanner 114 and/or a range of time before and/or after the receipt of the identifier captured by the scanner 114 and/or a scan indicator identified from one or more of the captured one or more images and audio received by an audio sensor coupled to the control circuit 102. In some embodiments, at step 706, the control circuit 102 determines that the item has been scanned based on the captured one or more images. In some embodiments, at step 708, the control circuit 102 determines that tracking of the item has been lost. In such an embodiment, losing track of an item may be due to the item being obscured by the user and/or another object from the at least one or more cameras 104. In some embodiments, at step 710, the control circuit 102 determines that the item has been bagged. In such an embodiment, the control circuit 102 determines that one or more images of the captured one or more images subsequently capture the item appearing at a location at a distant away from a location that the item was previously captured. In yet some embodiments, in response to the assignment of the received identifier captured by the scanner to the item detected in the captured images, determine that a mis-scan of the item has not occurred.

Figure 8:
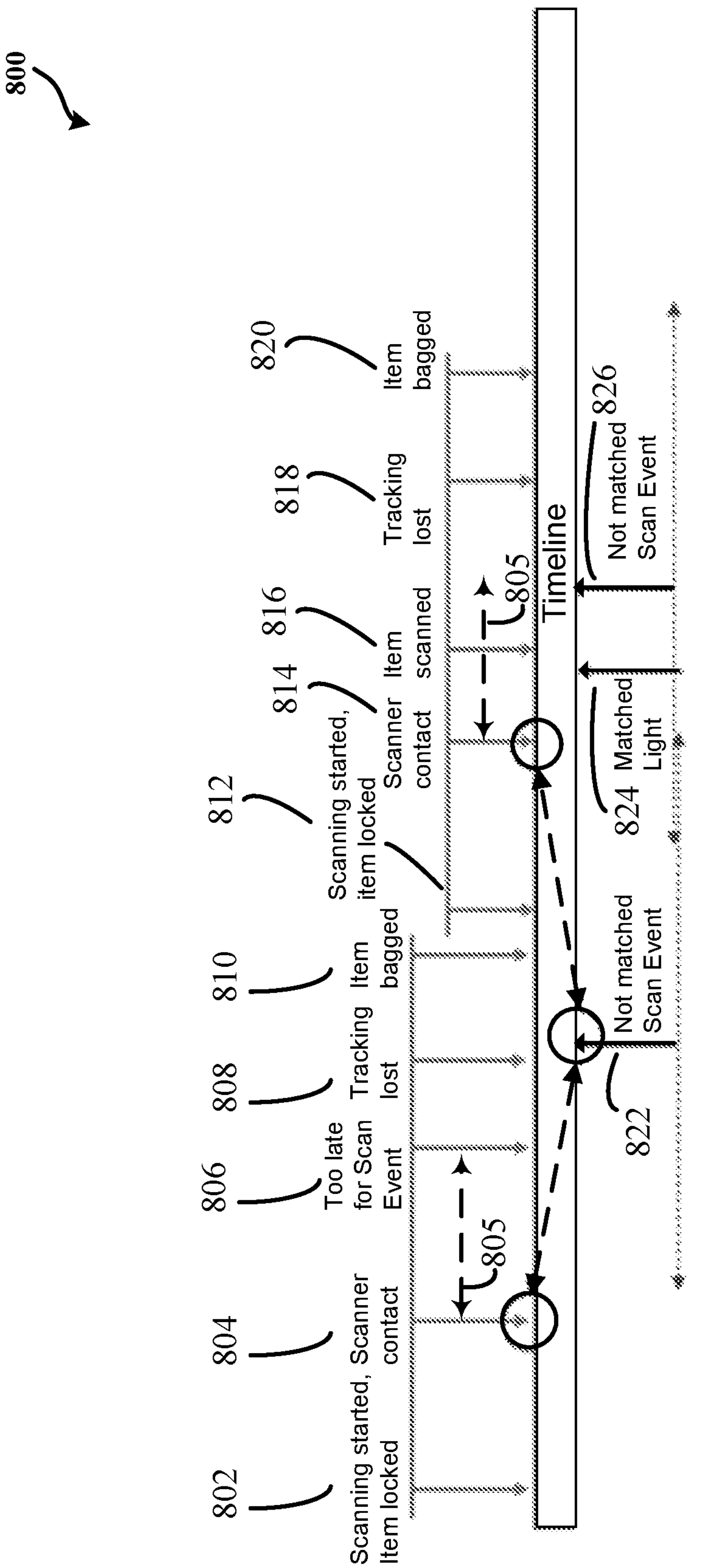
FIG. 8 shows a timeline of an exemplary process of detecting a mis-scan of an item for purchase in accordance with some embodiments.

Thus, in general terms, some embodiments of the invention attempt to assign received identifiers from the scanner to detected items 'seen' in the captured images. Generally, in some embodiments, if an assignment is made, the system determines that a mis-scan has likely not occurred. And, in some embodiments, if an assignment is not made, then the system determines that a mis-scan may have occurred. And further, in some embodiments, even if an assignment is not made, one or more factors or conditions may exist to cause the system to suspend an indication of a mis-scan detection. As shown in FIGS. 7 and 8, for a variety of reasons, the timing of the scanner signal receipt and the image detection process may not always align in time.

In continuing the illustrative non-limiting example above, at step 712, the control circuit 102 may use one or more image processing or machine learning models to process the captured one or more images to initiate a subsequent detection of mis-scan items at the checkout station 116. For example, at step 712, the control circuit 102 may identify the second item to be tracked on the captured one or more images. In some embodiments, at step 724, the control circuit 102 receives a second identifier captured by the scanner 114 prior to the control circuit 102 identifying a second item to be tracked. At step 714, the control circuit 102 determines that the second item has been placed in the scanning range of the scanner 114 based on the captured one or more images (e.g., scanner contact has been made). In some embodiments, at step 716, the control circuit 102 determines that the second item has been scanned based on the captured one or more images (e.g., the item is seen as passing the scanner and moving toward the bagging area). In some embodiments, at step 718, the control circuit 102 determines that tracking of the second item has been lost. In such an embodiment, losing track of the second item may be due to the second item being obscured by the user and/or another object from the at least one or more cameras 104. In some embodiments, at step 720, the control circuit 102 determines that the second item has been bagged.

In some embodiments, at step 724, the control circuit 102 determines that the second identifier has not been assigned. For example, as seen in the timeline, the identifier 724 is received well before the image system determines there has been scanner contact. In such an embodiment, in response the determination that the second identifier has not been assigned, where the second identifier was received prior to the placement of the second item in the scanning range of the scanner 114, the control circuit 102 assigns the second identifier to the second item. In some embodiments, in response to the assignment of the identifier to the item, determine that a mis-scan of the second item has not occurred. In some embodiments, at step 718, the control circuit 102 determines that tracking of the second item has been lost over the scanner bed of the scanner 114 and that substantially at the same time another item appeared based on the captured one or more images. In such an embodiment, the control circuit 102 determines that a mis-scan of the second item has not occurred.

FIG. 8 shows a timeline of an exemplary process/method 800 for detecting a mis-scan of an item for purchase in accordance with some embodiments. In another illustrative non-limiting example, at step 802, the control circuit 102 may use one or more image processing techniques and/or machine learning models to process the captured one or more images to initiate an initial and/or a subsequent detection of mis-scan items at a checkout station 116. In some embodiments, the one or more machine learning models used in the method 700 of FIG. 7 may be the same one or more machine learning models used in the method 800. In some embodiments, at step 802, the control circuit 102 may identify an item to be tracked on the captured one or more images. In some embodiments, at step 804, the control circuit 102 determines that a first identified item has been placed in scanning range of the scanner 114 based on the captured one or more images (e.g., determines visually that there has been scanner contact). In some embodiments, at step 806, the control circuit 102 determines that a corresponding identifier has not been received from the scanner 114 within a period of time 805 expected by the control circuit 102. That is, the period of time is illustrated as the time starting from the determination of scanner contact to the determination at step 806, shown as arrow 805. In some embodiments, at step 808, the control circuit 102 determines that tracking of the first identified item has been lost. In some embodiments, at step 822, the control circuit 102 receives a first identifier from the scanner 114 outside the period of time 805 expected by the control circuit 102. In some embodiments, at step 810, the control circuit 102 determines based on the captured one or more images that the first identified item has been bagged. In some embodiments, at step 812, subsequent to the bagging of the first identified item, the control circuit 102 identifies a second item on the one or more images to be tracked. At step 814, the control circuit 102 may then determine that a second identified item has been placed in scanning range of the scanner 114 based on the captured one or more images (e.g., determines there has been scanner contact with the second item). In some embodiments, at step 824, the control circuit 102 identifies a scan indicator (e.g., from the scanner 114 (but not an identifier, by detecting an emission of light (flash) from one or more of the captured one or more images indicating scanning has occurred, and/or from audio received by an audio sensor coupled to the control circuit 102) at a time within the period of time 805 expected by the control circuit 102 following the determination that the second identified item is placed in the scanning range. In response to the scan indicator (at 824) at the time within the period of time 805 expected by the control circuit 102 and following the determination that the second identified item is placed in the scanning range, the control circuit 102 may assign the first identifier to the first identified item. In some embodiments, at step 824, the control circuit 102 assigns the second identifier to the second identified item. In some embodiments, in response to the identification of the scan indicator, the control circuit 102 determines that a mis-scan of the first item has not occurred.

In some embodiments, at step 816, the control circuit 102 determines that the second identified item has been scanned based on the captured one or more images. In some embodiments, at step 818, the control circuit 102 determines that tracking of the second identified item has been lost. In such an embodiment, losing track of the second identified item may be due to the second identified item being obscured by the user and/or another object from the at least one or more cameras 104. In some embodiments, at step 820, the control circuit 102 determines that the second identified item has been bagged. In some embodiments, at step 826, the control circuit 102 receives a second identifier from the scanner 114. In such an embodiment, the control circuit 102 determines that no other item has been placed in the scanning range of the scanner 114 based on the captured one or more images. In response, the second identifier may be ignored, deleted, and/or considered assigned by the control circuit 102.

In yet another illustrative non-limiting example, subsequent to the initiation of the detection of mis-scan items, the control circuit 102 may identify an item to be tracked on the captured one or more images. In some embodiments, prior to the control circuit 102 receiving an identifier captured by the scanner 114, the control circuit 102 determines that the item has been placed in scanning range of the scanner 114 based on the captured one or more images. In some embodiments, subsequently, the control circuit 102 receives the identifier captured by the scanner 114. In response, the control circuit 102 may assign the identifier to the item. In response to the assignment of the identifier to the item, the control circuit 102 may determine that a mis-scan of the item has not occurred.

In yet another illustrative non-limiting example, subsequent to the initiation of the detection of mis-scan items, the control circuit 102 may receive an identifier from the scanner 114 within a period of time expected by the control circuit 102. In some embodiments, the control circuit 102 determines that at least two identified items have been brought into scanning range of the scanner 114 at proximate times (e.g., 1 second time window, 1 second frame, 3 frames, and/or any number of frames that is in close proximity relative to the shutter speed of a camera 104) based on the captured one or more images and that the identifier has been received from the scanner 114. In response, the control circuit 102 may determine that a mis-scan has not occurred. In such an embodiment, the control circuit 102 assigns the identifier to both the at least two identified items.

In yet another illustrative non-limiting example, subsequent to the initiation of the detection of mis-scan items, the control circuit 102 may receive an identifier from the scanner 114. In some embodiments, the control circuit 102 waits for a period of time (e.g., 30 frames, 40 frames, 35 frames, and/or any other number of predetermined frames) to determine that an item has been brought into scanning range of the scanner 114 based on the captured one or more images. In such an embodiment, the control circuit 102 may determine that a mis-scan has not occurred when, after waiting for the period of time, no item has been brought into scanning range of the scanner 114.

In yet another illustrative non-limiting example, subsequent to the initiation of the detection of mis-scan items, the control circuit 102 may determine that at least two identified items have been brought into scanning range of the scanner 114 at proximate times and that an item of the at least two identified items closest to the scanner 114 was not bagged based on the captured one or more images. In such an embodiment, the control circuit 102 may determine that a mis-scan has not occurred.

In yet another illustrative non-limiting example, subsequent to the initiation of the detection of mis-scan items, the control circuit 102 may determine that at least two identified items have been brought into scanning range of the scanner 114 at proximate times and that an item of the at least two identified items was determined to have been brought again into scanning range of the scanner 114 after being previously bagged based on the captured one or more images. In such an embodiment, the control circuit 102 determines that a mis-scan has not occurred.

In yet another illustrative non-limiting example, subsequent to the initiation of the detection of mis-scan items, the control circuit 102 may determine that at least two identified items have been brought into scanning range of the scanner 114 at proximate times and that one of the at least two identified items was subsequently assigned an identifier received from the scanner 114. In such an embodiment, the control circuit 102 determines that a mis-scan has not occurred on the remaining one of the at least two identified items even though a subsequent identifier was received from the scanner 114 and has not been assigned to an item.

In yet another illustrative non-limiting example, subsequent to the initiation of the detection of mis-scan items, the control circuit 102 may determine that an item being tracked over a scanning bed of the scanner 114 has been lost for a period of time (e.g., 30 seconds, 25 seconds, and/or any number of predetermined time value) and that the item has not reappeared at a staging area (e.g., the first staging location 120 and the second staging location 108) based on the captured one or more images. In such an embodiment, the control circuit 102 determines that a mis-scan has not occurred.

In yet another illustrative non-limiting example, subsequent to the initiation of the detection of mis-scan items, the control circuit 102 may determine that a previously scanned item was placed back with other items that have not been scanned (e.g., the first staging location 120) based on the captured one or more images. In such an embodiment, the control circuit 102 delays for a period of time (e.g., 40 seconds, 45 seconds, 35 seconds, and/or any number of predetermined time value or range) providing a mis-scan alert and/or determining that a mis-scan has occurred. In some embodiment, when the control circuit 102 determines that the previously scanned item was subsequently bagged within the period of time, the control circuit 102 determines that a mis-scan has not occurred. In yet some embodiment, when the control circuit 102 determines that the previously scanned item was not subsequently bagged within the period of time, the control circuit 102 determines that a mis-scan has occurred.

In yet another illustrative non-limiting example, subsequent to the initiation of the detection of mis-scan items, the control circuit 102 may receive an identifier from the scanner 114. In some embodiments, the control circuit 102 determines that no identified item has been brought into scanning range of the scanner 114 based on the captured one or more images. In some embodiments, the control circuit 102 determines that a mis-scan has not occurred.

In yet another illustrative non-limiting example, subsequent to the initiation of the detection of mis-scan items, the control circuit 102 may determine that a previously bagged item has been brought into scanning range of the scanner 114 based on the captured one or more images. In some embodiments, the control circuit 102 determines that a mis-scan of the previously bagged item has not occurred.

In yet another illustrative non-limiting example, subsequent to the initiation of the detection of mis-scan items, the control circuit 102 may determine that a previously scanned item was placed on the first staging location 120 based on the captured one or more images. In some embodiments, the control circuit 102 determines that a mis-scan of the previously scanned item has not occurred.

In yet another illustrative non-limiting example, subsequent to the initiation of the detection of mis-scan items, the control circuit 102 may determine that a mis-scan of a given item has occurred based at least on the captured one or more images of the second area of interest 110 and receipt of the one or more identifiers associated with the plurality of items located in the first staging location 120. In some embodiments, the control circuit 102 determines, via a trained machine learning model, a probability that a mis-scan has occurred based at least on analysis of the captured one or more images of the second area of interest 110 and the receipt of the one or more identifiers located in the first staging location 120. In some embodiments, the control circuit 102 determines, via the trained machine learning model and based on the probability relative to at least a threshold, that a mis-scan of the given item has not occurred. For example, a threshold may include a predetermined range of values and/or a predetermined value. In some embodiments, the trained machine learning model and/or the one or more machine learning models described herein may be based on the random forest model/algorithm and/or anyone of the publicly available machine learning algorithms usable for training a control circuit 102 to detect, track, and/or determine items and/or events and/or activities in captured images. For example, analysis of the captured one or more images by the control circuit 102 via the trained machine learning model may include consideration of one or more features as described below.

In yet another illustrative non-limiting example, subsequent to the initiation of the detection of mis-scan items, the control circuit 102 may determine that a mis-scan of a given item has occurred based at least on the captured one or more images of the second area of interest 110 and receipt of the one or more identifiers associated with the plurality of items located in the first staging location 120. In some embodiments, the control circuit 102 evaluates one or more detected factors (e.g., one or more features described below) from the captured one or more images. In some embodiments, the control circuit 102 determines, based on the evaluation, that the mis-scan of the given item has not occurred.

In yet another illustrative non-limiting example, subsequent to the initiation of the detection of mis-scan items, the control circuit 102 may assign one or more identifiers received from the scanner 114 with one or more tracked items based on a determination that the one or more items on the captured one or more images have been brought into scanning range of the scanner 114 and in relation to receipt of the one or more identifiers. In some embodiments, in response to the assignment of the one or more identifiers with the one or more tracked items, the control circuit 102 determines that a mis-scan has occurred or not.

In yet another illustrative non-limiting example, subsequent to the initiation of the detection of mis-scan items, the control circuit 102 may determine that a mis-scan of a given item has occurred based at least on the captured one or more images of the second area of interest 110 at the subsequent time and receipt of one or more identifiers associated with the plurality of items. In some embodiments, the control circuit 102 determines, via a trained machine learning model such as those described herein, a probability that the mis-scan has occurred based at least on analysis of the captured one or more images of the second area of interest 110 and the receipt of the one or more identifiers. In some embodiments, the control circuit 102 determines, via the trained machine learning model and based on the probability relative to at least a threshold, that a mis-scan of the given item has not occurred.

In yet another illustrative non-limiting example, subsequent to the initiation of the detection of mis-scan items, the control circuit 102 may determine that a mis-scan of a given item has occurred based at least on the captured one or more images of the second area of interest 110 at the subsequent time and receipt of the one or more identifiers associated with the plurality of items. In some embodiments, the control circuit 102 evaluates one or more detected factors (e.g., one or more features described below) from the captured one or more images. In some embodiments, the control circuit 102 determines, based on the evaluation, that the mis-scan of the given item has not occurred. In some embodiments, the determination by the control circuit 102 on whether a mis-scan has occurred or has not occurred is an estimate and/or an inference determined by the control circuit 102 based on data received and/or determined, such as but not limited to images captured by at least one camera 104, identifiers received from the scanner 114, input from a machine learning model, a scan indication signal, to name a few.

In some embodiments, one or more features that are scene summary data generated from analysis of images and used by the trained machine learning model. In some embodiments, each of the one or more features is associated with a corresponding probability value that equates to the corresponding feature's level of usefulness and/or effectiveness in determining whether a mis-scan has occurred or not. In some embodiments, the one or more features include number of items being tracked, the position and/or locations of the tracked items, how close are the tracked items to one another, speed of the scan, item transition time, frame rate of at least one camera 104, composition and/or orientation of the checkout station 116, field of view (FOV) of at least one camera 104, to name a few.

For example, one feature may correspond to maximum overlap between an item bounding box and a scanner 114 in the item's entire trajectory. In another example, another feature may correspond to a length of time (# of frames) the item's bounding box overlaps with the scanner 114 in the item's entire trajectory. In another example, another feature may correspond to the "rate of missing frames" feature that calculates the fraction of frames that are missing due to frame dropping. By one approach, an increase in missing frames in a scene leads to reduction in performance of the control circuit 102 and/or the system 100 of FIG. 1 in detecting a mis-scan of an item. In another example, another feature may correspond to an overlap percentage in a first contact (e.g., an item has been brought into scanning range of the scanner 114) when the item's bounding box overlaps with the scanner 114. In another example, another feature may correspond to a region, a portion, and/or an area of an image. In some embodiments, a region, a portion, and/or an area includes the scanner 114, a scanner bed, an aisle (e.g., where a user and/or a customer is standing, a bagging area, a checkout station conveyor belt, a staging area, to name a few). In such an example, another feature may correspond to a number assigned to a region which the item started from in the scene and/or image. In another example, one or more features may correspond to coordinate locations normalized by the scanner bed width due to different zooms of at least one camera 104. In another example, another feature may correspond to an area of the scanner bed to account for different zooms of at least one camera 104. In another example, another feature may correspond to counts of how many other objects and object trajectories are present in the scene (e.g., image). In another example, another feature may correspond to trajectory length of the other item during the current mis-scanned item's trajectory. In another example, another feature may correspond to a measurement of how long the other item that received the scan event was in contact with the scanner 114 during the current mis-scanned item's trajectory. In another example, another feature may correspond to a measurement of the relative jump of the item from one frame to the next, as compared to its 3-period (e.g. three frames, unless frames are dropped and then the period is extended to add an additional frame) moving average jump look-back. In another example, another feature may correspond to a maximum overlap between the scanner 114 and the other item that received the scan event during the current mis-scanned item's trajectory. In another example, another feature may correspond to a measurement of how much up and down the item moves (e.g., standard deviation of the y coordinates per length of the scanner). In another example, another feature may correspond to an average speed of an object's tracker from frame to frame, normalized by the area of scanner 114 to account for zoom of at least one camera 104. In another example, another feature may correspond to an angle from the position where the item starts in the scene to the position of the scanner 114. In another example, another feature may correspond to number of scan events received (e.g., identifier received from the scanner 114) but not assigned to any item during the mis-scanned item's trajectory. In another example, another feature may correspond to when another item receives the scan event, measurement of the maximum overlap between the mis-scanned item bounding box with the scanner 114. In another example, another feature may correspond to number of staged items detected and tracked during the mis-scanned item's trajectory. In another example, another feature may correspond to the orientation (e.g., left-bagging or right-bagging) of the SCO (e.g., the checkout station 116). In another example, another feature may correspond to non assigned scan event (e.g., a scan event described herein and on FIGS. 7 and 8 correspond to a receipt of an identifier from the scanner 114) detected during item's contact with the scanner 114. In another example, another feature may correspond to number of unassigned scan events minus red light scans. In another example, one or more features may include SCO type/orientation, length of trajectory, and/or number of non-missing detections in the main item trajectory.

In some embodiments, one or more of the features are analyzed by the machine learning model to assess whether or not to output a mis-scan alert. In some embodiments, the data may indicate a potential mis-scan event (e.g., mismatch in an identifier from scanner and visually detected items), and the model is used to determine whether to suspend the mis-scan detection alert. For example, in some embodiments, the model is used in the decision 510 in FIG. 5. It is understood these features are exemplary and one or more of these features and other features may be considered.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for detecting a mis-scan of an item for purchase at a checkout station of a retail store, the system comprising:

a checkout station of a retail store comprising a scanner to capture an identifier associated with a first item of a plurality of items for purchase;

a first staging location to secure the plurality of items before the items pass by the scanner;

a second staging location to secure the plurality of items after the items pass by the scanner;

a first area of interest at the checkout station comprising a first proximate area encompassing the scanner and within a first threshold distance from the scanner;

a second area of interest at the checkout station comprising a second proximate area within a second threshold distance from the scanner, wherein the second area of interest encompasses the second staging location and is larger than the first area of interest;

a camera to:

capture a first image of the first area of interest at a first time during a checkout process; and capture one or more images of the second area of interest at a subsequent time; and a control circuit communicatively coupled to the scanner and the camera, the control circuit to:

receive the identifier of the first item;

detect a hand of a user purchasing the first item, the first item, and the scanner in the first image captured by the camera at the first time;

in response to the detection of the hand, the first item, and the scanner, initiate detection of mis-scan items during the checkout process, wherein the detection of mis-scan items is based at least on the plurality of items detected at the second staging location in the captured one or more images of the second area of interest at the subsequent time and receipt of one or more identifiers associated with the plurality of items located in the first staging location;

determine that a payment transaction has been received from a user purchasing the first item; and in response to the receipt of the payment transaction, stop the detection of mis-scan items.

2. The system of claim 1, wherein the control circuit is further to cause the camera to capture the second area of interest in response to the detection of the hand, the first item, and the scanner in the first image.

3. The system of claim 2, wherein the second area of interest comprises substantially the checkout station, the first staging location, and the second staging location.

4. The system of claim 1, wherein the first staging location comprises a conveyor belt, a cart, a basket, or the user, and wherein the second staging location comprises a shopping bag, the cart, the basket, or the user.

5. The system of claim 1, wherein the camera is assigned to the checkout station.

6. The system of claim 1, wherein the control circuit is further to, subsequent to the initiation of the detection of mis-scan:

track movement of each remaining one of the plurality of items from the first staging location to the second staging location;

determine that a corresponding identifier of a corresponding remaining one of the plurality of items tracked to move from the first staging location to the second staging location has been captured by the scanner; and in response to the determination that the corresponding identifier has been captured by the scanner, determine that a mis-scan has not occurred and cause the checkout process to continue.

7. The system of claim 1, wherein the control circuit is further to, subsequent to the initiation of the detection of mis-scan:

track movement of each remaining one of the plurality of items from the first staging location to the second staging location;

determine that a corresponding identifier of a corresponding remaining one of the plurality of items tracked to move from the first staging location to the second staging location has not been captured by the scanner; and in response to the determination that the corresponding identifier has not been captured by the scanner, determine that a mis-scan has likely been detected and cause suspension of the checkout process.

8. The system of claim 7, wherein the control circuit is further to determine that the corresponding remaining one is a saleable item prior to the determination that the corresponding identifier has not been captured by the scanner.

9. The system of claim 7, wherein the control circuit is further to provide an alert to at least one of a checkout station host and an associate to verify the detection of the mis-scan.

10. The system of claim 9, wherein the control circuit is further to end the suspension and continue the checkout process upon a receipt of an input from at least one of the checkout station host and the associate.

11. The system of claim 1, wherein the control circuit is further to, subsequent to the initiation of the detection of mis-scan:

track movement of each remaining one of the plurality of items from the first staging location to the second staging location; and determine that a mis-scan has not occurred even when no identifier has been received subsequent to the tracked movement of the remaining one from the first staging location to the second staging location upon a determination that at least one of:

a hand-held scanner was used to capture a corresponding identifier of a corresponding remaining one of the plurality of items tracked to move from the first staging location to the second staging location;

a user has interacted with a display device of the checkout station;

receipt at multiple times of the corresponding identifier and a subsequent movement of a single item from the first staging location to the second staging location, wherein the movement of the single item comprises a single movement of a group of multiple remaining ones of the plurality of items from the first staging location to the second staging location; and the hand of the user is detected to hold an unidentified item proximate to a payment device, wherein the unidentified item comprises a credit card and cash.

12. The system of claim 1, wherein the control circuit is further to, subsequent to the initiation of the detection of mis-scan items:

receive an identifier captured by the scanner;

identify an item in the captured one or more images;

determine that the item has been placed in scanning range of the scanner from the captured one or more images;

assign the identifier to the item; and in response to the assignment of the identifier to the item, determine that a mis-scan of the item has not occurred.

13. The system of claim 1, wherein the control circuit is further to, subsequent to the initiation of the detection of mis-scan items:

receive an identifier captured by the scanner prior to the control circuit identifying an item to be tracked;

identify the item to be tracked on the captured one or more images;

determine that the item has been placed in scanning range of the scanner based on the captured one or more images;

assign the identifier to the item; and in response to the assignment of the identifier to the item, determine that a mis-scan of the item has not occurred.

14. The system of claim 1, wherein the control circuit is further to, subsequent to the initiation of the detection of mis-scan items:

identify an item to be tracked in the captured one or more images;

determine that the item has been placed in scanning range of the scanner based on the captured one or more images prior to the control circuit receiving an identifier captured by the scanner;

receive the identifier captured by the scanner;

assign the identifier to the item; and in response to the assignment of the identifier to the item, determine that a mis-scan of the item has not occurred.

15. The system of claim 1, wherein the control circuit is further to, subsequent to the initiation of the detection of mis-scan items:

determine that a first identified item has been placed in scanning range of the scanner based on the captured one or more images;

determine that a corresponding identifier has not been received from the scanner within a period of time expected by the control circuit;

receive a first identifier from the scanner outside the period of time expected by the control circuit;

identify a second item in the one or more images to be tracked;

determine that a second identified item has been placed in scanning range of the scanner based on the captured one or more images;

identify a scan indicator at a time within the period of time expected by the control circuit following the determination that the second identified item is placed in the scanning range;

assign the first identifier to the first identified item; and in response to the identification of the scan indicator, determine that a mis-scan of the first item has not occurred.

16. The system of claim 1, wherein the control circuit is further to, subsequent to the initiation of the detection of mis-scan:

receive an identifier from the scanner within a period of time expected by the control circuit;

determine that at least two identified items have been brought into scanning range of the scanner at proximate times based on the captured one or more images and that the identifier has been received; and determine that a mis-scan has not occurred.

17. The system of claim 1, wherein the control circuit is further to, subsequent to the initiation of the detection of mis-scan:

receive an identifier from the scanner;

determine that no identified item has been brought into scanning range of the scanner based on the captured one or more images; and determine that a mis-scan has not occurred.

18. The system of claim 1, wherein the control circuit is further to, subsequent to the initiation of the detection of mis-scan:

determine that a previously bagged item has been brought into scanning range of the scanner; and determine that a mis-scan of the previously bagged item has not occurred.

19. The system of claim 1, wherein the control circuit is further to, subsequent to the initiation of the detection of mis-scan:

determine that a previously scanned item was placed on the first staging location; and determine that a mis-scan of the previously scanned item has not occurred.

20. The system of claim 1, wherein the control circuit is further to, subsequent to the initiation of the detection of mis-scan:

determine that a mis-scan of a given item has occurred based at least on the captured one or more images of the second area of interest and receipt of the one or more identifiers associated with the plurality of items located in the first staging location;

determine, via a trained machine learning model, a probability that the mis-scan has occurred based at least on analysis of the captured one or more images of the second area of interest and the receipt of the one or more identifiers located in the first staging location; and determine, via the trained machine learning model and based on the probability relative to at least a threshold, that a mis-scan of the given item has not occurred.

21. The system of claim 1, wherein the control circuit is further to, subsequent to the initiation of the detection of mis-scan:

determine that a mis-scan of a given item has occurred based at least on the captured one or more images of the second area of interest and receipt of the one or more identifiers associated with the plurality of items located in the first staging location;

evaluate one or more detected factors from the captured one or more images; and determine, based on the evaluation, that the mis-scan of the given item has not occurred.

22. A system for detecting a mis-scan of an item for purchase at a checkout station of a retail store, the system comprising:

a checkout station of a retail store comprising a scanner to capture an identifier associated with a first item of a plurality of items for purchase;

a first area of interest at the checkout station comprising a first proximate area encompassing the scanner and within a first threshold distance from the scanner;

a second area of interest at the checkout station comprising a second proximate area within a second threshold distance from the scanner, wherein the second area of interest is larger than the first area of interest and encompasses a second staging location to secure the plurality of items after the plurality of items pass by the scanner;

at least one camera to:

capture a first image of the first area of interest at a first time during a checkout process; and capture one or more images of the second area of interest at a subsequent time; and a control circuit communicatively coupled to the scanner and the at least one camera, the control circuit to:

receive the identifier of the first item;

detect a hand, the first item, and the scanner at the first area of interest in the first image captured by the at least one camera at the first time; and in response to the detection of the hand, the first item, and the scanner, initiate detection of mis-scan items during the checkout process, wherein the detection of mis-scan items is based at least on the plurality of items detected at the second staging location in the captured one or more images of the second area of interest at the subsequent time and receipt from the scanner of one or more identifiers associated with the plurality of items.

23. The system of claim 22, wherein the control circuit is further to, subsequent to the initiation of the detection of mis-scan:

assign the one or more identifiers received from the scanner with one or more tracked items based on a determination that the one or more items in the captured one or more images have been brought into scanning range of the scanner and in relation to receipt of the one or more identifiers; and in response to the assignment of the one or more identifiers with the one or more tracked items, determine that a mis-scan has occurred or not.

24. The system of claim 22, wherein the control circuit is further to, subsequent to the initiation of the detection of mis-scan:

determine that a mis-scan of a given item has occurred based at least on the captured one or more images of the second area of interest at the subsequent time and receipt from the scanner of the one or more identifiers associated with the plurality of items;

determine, via a trained machine learning model, a probability that the mis-scan has occurred based at least on analysis of the captured one or more images of the second area of interest and the receipt of the one or more identifiers; and determine, via the trained machine learning model and based on the probability relative to at least a threshold, that a mis-scan of the given item has not occurred.

25. The system of claim 22, wherein the control circuit is further to, subsequent to the initiation of the detection of mis-scan:

determine that a mis-scan of a given item has occurred based at least on the captured one or more images of the second area of interest at the subsequent time and receipt from the scanner of the one or more identifiers associated with the plurality of items;

evaluate one or more detected factors from the captured one or more images; and determine, based on the evaluation, that the mis-scan of the given item has not occurred.

26. The system of claim 1, wherein the first area of interest does not encompass the first staging location or the second staging location, and wherein the second area of interest encompasses the first staging location.

27. The system of claim 22, further comprising a first staging location to secure the plurality of items before the plurality of items are scanned by the scanner, wherein the first area of interest does not encompass the first staging location or the second staging location, and wherein the second area of interest encompasses the first staging location.

28. The system of claim 1, wherein the mis-scan of the first item is an occurrence, when the first item passes by the scanner of the checkout station and is placed into the second staging location without the first item being scanned by the scanner.

29. The system of claim 22, wherein the mis-scan of the first item is an occurrence, when the first item passes by the scanner of the checkout station and is placed into the second staging location without the first item being scanned by the scanner.

* * * * *